(12) United States Patent
Fosnacht et al.

(10) Patent No.: US 7,939,154 B2
(45) Date of Patent: May 10, 2011

(54) ROAD AND REPAIR MATERIALS INCLUDING MAGNETITE AND METHODS REGARDING SAME

(75) Inventors: Donald R. Fosnacht, Hermantown, MN (US); David W. Hendrickson, Hibbing, MN (US); Richard Kiesel, Hibbing, MN (US); Lawrence M. Zanko, Two Harbors, MN (US); Tamara R. Diedrich, Duluth, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 375 days.

(21) Appl. No.: 12/262,861

(22) Filed: Oct. 31, 2008

(65) Prior Publication Data
US 2009/0117265 A1    May 7, 2009

Related U.S. Application Data

(60) Provisional application No. 61/001,589, filed on Nov. 2, 2007.

(51) Int. Cl.
*B32B 3/26* (2006.01)
*B32B 5/16* (2006.01)
(52) U.S. Cl. .............................. 428/63; 404/75; 106/691
(58) Field of Classification Search .................... 428/63; 404/75; 106/691
See application file for complete search history.

(56) References Cited

U.S. PATENT DOCUMENTS

| | | | |
|---|---|---|---|
| 4,066,471 A | 1/1978 | Burke | |
| 4,402,749 A | 9/1983 | Hall et al. | |
| 4,431,335 A | 2/1984 | Evans | |
| 4,571,860 A | 2/1986 | Long | |
| 5,645,518 A | 7/1997 | Wagh et al. | |
| 5,830,815 A | 11/1998 | Wagh et al. | |
| 5,846,894 A | 12/1998 | Singh et al. | |
| 6,075,176 A | 6/2000 | Aloy et al. | |
| 6,133,498 A | 10/2000 | Singh et al. | |
| 6,153,809 A | 11/2000 | Singh et al. | |
| 6,204,214 B1 | 3/2001 | Singh et al. | |
| 6,498,119 B2 | 12/2002 | Wagh et al. | |
| 6,518,212 B1 | 2/2003 | Wagh et al. | |
| 6,569,263 B2 | 5/2003 | Brown et al. | |
| 6,776,837 B2 | 8/2004 | Wagh et al. | |

OTHER PUBLICATIONS

"Accuflex Gel-Seal Waterproofing Material Safety Data Sheet" datasheet [online]. Superior Coating Specialists, Proctor, MN, Jul. 15, 2006. Retrieved from the Internet:<URL:http://wvvw.accuflexcoatings.com/uploads/GSW_MSDS_1.pdf>; 4 pgs.

"Advanced Ceramic Material Finds Use in Potholes," Argonne National Laboratory, Argonne, Illinois, [retrieved on Jan. 17, 2005]. Retrieved from the Internet: <URL: http://www.itd.anl.gov/techtour/ceramicrete-pothole.html>; 3 pgs.

"Alkali-Silica Reactivity," Technical Brief #13, Canadian Strategic Highway Research Program, Ottawa, Ontario, Apr. 1996, 8 pgs.

(Continued)

*Primary Examiner* — Alexander Thomas
(74) *Attorney, Agent, or Firm* — Mueting Raasch & Gebhardt, P.A.

(57) ABSTRACT

A road and repair system and/or method using one or more components including a plurality of magnetite concentrate particles, at least one acidic activator including phosphate anions, and a plurality of reactive aggregate particles including iron.

20 Claims, 8 Drawing Sheets

OTHER PUBLICATIONS

"Appendix D: Alkali-Silica Aggregate Reactions" in Engineering and Design—Standard Practice for Concrete for Civil Works Structures, Department of the Army, U.S. Army Corps of Engineers, Washington, DC, Feb. 1, 1994, Publication No. EM 1110-2-2000, pp. D1-D6. Retrieved from the Internet: <URL: http://140.194.76.129/publications/eng-manuals/em1110-2-2000/a-d.pdf>; 6 pgs.

"Ceramicrete: Applications, Advantages, and Economics," Argonne National Laboratory, Argonne, Illinois, [retrieved on Mar. 18, 2009]. Retrieved from the Internet: <URL: http://www.anl.gov/techtransfer/Available_Technologies/Material_Science/Ceramicrete/Ceramicret_advantages.html>; 1 pg.

"Ceramicrete: Chemically Bonded Ceramic," Argonne National Laboratory, Argonne, Illinois, [retrieved on Mar. 18, 2009]. Retrieved from the Internet: <URL: http://www.anl.gov/techtransfer/Available_Technologies/Material_Science/Ceramicrete/index.html>; 1 pg.

"Ceramicrete: Major Recent Publications and Presentations," Argonne National Laboratory, Argonne, Illinois, [retrieved on Feb. 19, 2009]. Retrieved from the Internet: <URL: http://www.anl.gov/techtransfer/Available_Technologies/Materia_Science/Ceramicrete/Ceramicrete_Pubs.html>; 1 pg.

"Ceramicrete: Patents and Licensing," Argonne National Laboratory, Argonne, Illinois, [retrieved on Feb. 21, 2005]. Retrieved from the Internet: <URL: http://www.itd.anl.gov/techtour/ceramicrete-patents.html>; 1 pg.

"Ceramicrete Provides Concrete Evidence of Superior Performance," Argonne National Laboratory, Argonne, Illinois, Apr. 2003 [retrieved on Mar. 31, 2009]. Retrieved from the Internet: <URL: http://www.anl.gov/techtransfer/pdf/ceramicrete4-7-03.pdf>; 2 pgs.

"Concrete Crack Eliminator" datasheet [online]. Accuflex Coatings, Proctor, Minnesota, 2007 [retrieved on Mar. 31, 2009]. Retrieved from the Internet:<URL: http://www.accuflexcoatings.com/uploads/Crack_Elim_Data_1_.pdf>; 2 pgs.

Davis, "Appendix 1: Taconite Technology and Pricing" in "Pioneering with Taconite," Minnesota Historical Society, St. Paul, MN, 1964; pp. 202-208.

Fosnacht et al., "Research, Development, and Marketing of Minnesota's Iron Range Aggregate Materials for Midwest and National Transportation Applications: Jan. 2007 Progress Report to the Economic Development Administration" (Technical Summary Report NRRI/TSR-2007/01), Natural Resources Research Institute, University of Minnesota, Duluth, MN, Jan. 2007; 45 pgs.

"Gel-Seal Waterproofing" datasheet [online]. Accuflex Coatings by Superior Coating Specialists, Proctor, MN, Jul. 15, 2006 [retrieved on Mar. 31, 2009]. Retrieved from the Internet:<URL:http://www.accuflexcoatings.com/uploads/GSW_Data_7-15-06.pdf>; 2 pgs.

Hopstock et al., "Minnesota Taconite as a Microwave-Absorbing Road Aggregate Material for Deicing and Pothole Patching Applications" (CTS 05-10), Intelligent Transportation Systems Institute, Center for Transportation Studies, University of Minnesota, Minneapolis, MN, Aug. 2005 [retrieved on Mar. 31, 2009]. Retrieved from the Internet <URL:http://www.cts.umn.edu/pdf/CTS-05-10.pdf>; 26 pgs.

"Ionizing & Non-Ionizing Radiation" [online]. United States Environmental Protection Agency, Washington, DC, 2008 [retrieved on Oct. 27, 2008]. Retrieved from the Internet: <URL: http://www.epa.gov/radiation/understand/ionize_nonionize.html>; 3 pgs.

Jeong et al., "Chemically bonded phosphate ceramics: Cementing the gap between ceramics and cements," manuscript submitted to *Materials Technology*, Jun. 2002 [retrieved Mar. 31, 2009]. Retrieved from the Internet: <URL:http://wwvv.anl.gov/techtransfer/Available_Technologies/Material_Science/Ceramicrete/ceramicrete.pdf>; 23 pgs.

Minneapolis Tribune Background, "Taconite spurs increase in state iron production," "Taconite What is it?," "Refining readies taconite ore for steel mills," "Taconite residue—disposal problem," and "Iron is key to making steel," Jul. 29, 1973, p. 19A.

"Non-ionizing radiation" [online]. Wikipedia Foundation, Inc., San Francisco, CA, 2008 [retrieved on Oct. 27, 2008]. Retrieved from the Internet: <URL: http://en.-wikipedia.org/wiki/Non-ionizing_radiation.html>; 3 pgs.

"Particle Size Conversion Table," in *2003-2004 Aldrich Catalog/Handbook of Fine Chemicals*, Sigma-Aldrich Co., St. Louis, MO, p. T848.

"Phosphoric acid, ortho-," in "Table 3-1 Physical Properties of the Elements and Inorganic Compounds (Continued)" in *Perry's Chemical Engineers' Handbook*, Sixth Edition, McGraw-Hill Inc., New York, NY, p. "3-18," 1 pg.

"Table 1. Parameters of Ceramicrete Binders," Argonne National Laboratory, Argonne, Illinois, Jun. 2001 [retrieved on Mar. 31, 2009]. Retrieved from the Internet: <URL: http://www.anl.gov/techtransfer/Available_Technologies/Material_Science/Ceramicrete/properties-table1.pdf>; 2 pgs.

"Table 2. Ceramicrete Properties," Argonne National Laboratory, Argonne, Illinois, Jun. 2001 [retrieved on Mar. 31, 2009]. Retrieved from the Internet: <URL: http://www.anl.gov/techtransfer/Available_Technologies/Material_Science/Ceramicrete/properties-table2.pdf>; 2 pgs.

"Table 3. Product Applications," Argonne National Laboratory, Argonne, Illinois, Jun. 2001 [retrieved on Mar. 31, 2009]. Retrieved from the Internet: <URL: http://www.anl.gov/techtransfer/Available_Technologies/Materia_Science/Ceramicrete/properties-table3.pdf>; 1 pg.

"Taconite tailings: a new source of aggregate for roadway construction," University of Minnesota, LTAP, [retrieved on Mar. 1, 2005]. Retrieved from the Internet:<URL: http://www.mnltap.umn.edu/publications/exchange/2004-4/2004-4-1-2.html>; 1 pg. Reprinted from CTS (Center for Transportation Studies) Research E-news, Jun. 2004.

Wagh et al., "Iron-Phosphate-based Chemically Bonded Phosphate Ceramics for Mixed Waste Stabilization," Jan. 1997, 10 pgs. Paper for presentation at Waste Management Annual Meeting, Tucson, Arizona, Mar. 2-6, 1997.

Wagh et al., "Chemically Bonded Phosphate Ceramics: III, Reduction Mechanism and its Application to Iron Phosphate Ceramics," *J Am. Ceram. Soc.*, 2003, 86: 1850-1855.

Wagh et al., "High Strength Phosphate Cement Using Industrial Byproduct Ashes," in *Proc. First International Conf*, ed. A. Azizinamini et al., pub. Amer. Soc. Civil Eng., 1997, 542-553 [retrieved Mar. 20, 2009]. Retrieved from the Internet: <URL:http://vvww.anl.gov/techtransfer/Available_Technologies/Material_Science/Ceramicrete/hawai_paper.pdf>; 9 pgs.

Zanko et al., "Minnesota Taconite as a Microwave-Absorbing Road Aggregate Material for Deicing and Pothole Patching Applications" (NRRI Technical Report NRRI/TR-2004/19), Minnesota Department of Transportation, St. Paul, MN, Aug. 2004.

Zanko et al., "Properties and Aggregate Potential of Coarse Taconite Tailings from Five Minnesota Taconite Operations: Final Report," Minnesota Department of Transportation, St. Paul, MN, Dec. 2003[retrieved on Mar. 17, 2009]. Retrieved from the internet <URL:http://www.lrrb.org/pdf/200406.pdf>; cover page, technical report documentation page, title page, acknowledgments, table of contents, list of figures, list of tables, and executive summary only; 15 pgs.

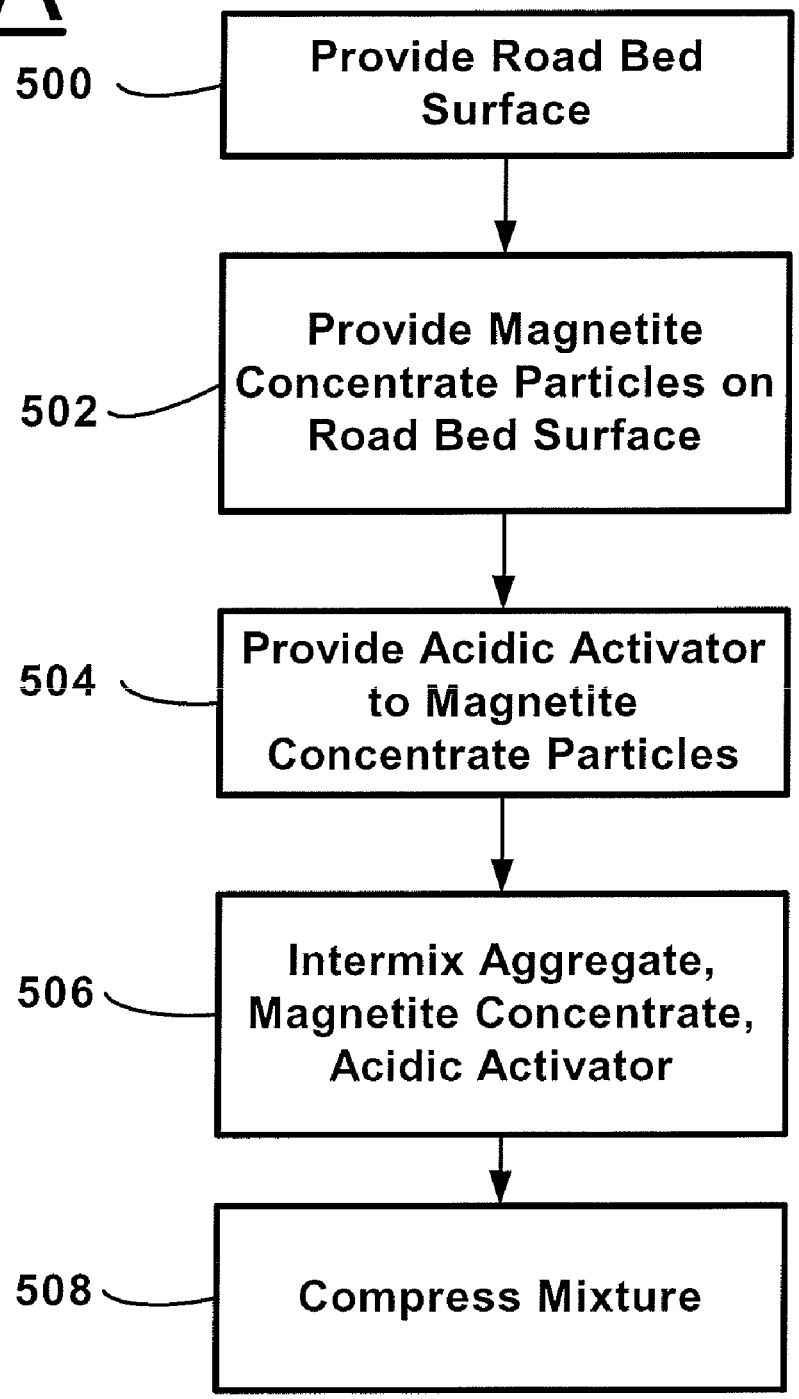

ROAD AND REPAIR MATERIALS INCLUDING MAGNETITE AND METHODS REGARDING SAME

CROSS REFERENCE TO RELATED APPLICATIONS

This application claims priority benefit of the provisional patent application having U.S. Patent Application Ser. No. 61/001,589, filed on 2 Nov. 2007, which is hereby incorporated by reference in its entirety.

BACKGROUND

Construction materials are used for many purposes. For example, potholes are a common road defect. For safety reasons, highway departments seek to repair these and other road defects as quickly as possible. However, for example, inclement weather may cause significant delays until optimum repair conditions arise. The search for new high quality road materials and patching materials, e.g., such as those for application in various ambient conditions, continues to become more important as vehicular traffic on highways and roads continues to increase.

Repair materials need to be hard, durable, and resistant to traffic wear and weather conditions. Many conventional repair materials, for example, are not suitable for use in repairing defects during winter months. Such repair materials commonly degrade or become dislodged from the repair site, requiring subsequent repair of the same repair site.

New materials are desired for construction and maintenance in various ambient conditions.

SUMMARY

The present disclosure provides a system for use in preparing patching material. The system includes one or more components. The one or more components include a plurality of magnetite concentrate particles, at least one acidic activator including phosphate anions, and a plurality of reactive aggregate particles including iron. The plurality of magnetite concentrate particles may have a size of –200 mesh and may have a reactive iron concentration greater than 55 percent by weight. The reactive iron concentration of the plurality of reactive aggregate particles may be in a range of 3 percent to 47 percent by weight. The plurality of reactive aggregate particles may have a size in a range of +100 mesh to –1 inch mesh and may be in a range of 15 percent to 80 percent by weight of all the one or more components of the system.

The present disclosure also provides a method for applying patching material. The method includes preparing a mixture that includes a plurality of magnetite concentrate particles, at least one acidic activator including phosphate anions, and a plurality of reactive aggregate particles including iron. The plurality of magnetite concentrate particles may have a size of –200 mesh and may have a reactive iron concentration greater than 55 percent by weight. The reactive iron concentration of the plurality of reactive aggregate particles may be in a range of 3 percent to 47 percent by weight. The plurality of reactive aggregate particles may have a size in a range of +100 mesh to –1 inch mesh and may be in a range of 15 percent to 80 percent by weight of the mixture. The method further includes applying the mixture to a repair site and allowing the mixture to cure.

The present disclosure also provides a repair system for use in patching a repair site having at least one surface. The repair system may include a mixture applied on the at least one surface of a repair site resulting in an exposed mixture surface, the mixture applied on the at least one surface having a maximum first thickness measured from the at least one surface of the repair site to the exposed mixture surface. The mixture may include a plurality of magnetite concentrate particles, at least one acidic activator including phosphate anions, and a plurality of reactive aggregate particles including iron. The plurality of magnetite concentrate particles may have a size of –200 mesh and may have a reactive iron concentration greater than 55 percent by weight. The reactive iron concentration of the plurality of reactive aggregate particles may be in a range of 3 percent to 47 percent by weight. The plurality of reactive aggregate particles may have a size in a range of +100 mesh to –1 inch mesh and may be in a range of 15 percent to 80 percent by weight of the mixture. The repair system also includes at least one elastomeric coating applied on the exposed mixture surface, wherein the elastomeric coating has a second thickness, and further wherein the first thickness is greater than or equal to 90 percent of a total thickness of the maximum first thickness and second thickness.

The present disclosure also provides a method for stabilizing a road bed surface that includes a plurality of aggregate particles. The method includes providing a plurality of magnetite concentrate particles having a size of –200 mesh to a road bed surface that includes a plurality of aggregate particles. The method also includes providing at least one acidic activator including phosphate anions to the plurality of magnetite concentrate particles; intermixing the plurality of magnetite concentrate particles, the acidic activator, and the plurality of aggregate particles to form a mixture; and compressing the mixture. In at least one embodiment, the plurality of magnetite concentrate particles may have a reactive iron concentration greater than 55 percent by weight. In one or more embodiments, the at least one acidic activator may include orthophosphoric acid.

The present disclosure also provides a system for use in stabilizing a road bed surface that includes a plurality of aggregate particles. The system for use in stabilizing a road bed surface may include a controllable source of magnetite concentrate particles capable of providing a plurality of magnetite concentrate particles to the road bed surface. The plurality of magnetite concentrate particles may have a size of –200 mesh. The system for use in stabilizing a road bed surface may further include a controllable source of at least one acidic activator that includes phosphate anions capable of providing the at least one acidic activator that includes phosphate anions to the plurality of magnetite concentrate particles. The system may further include a mixer that can intermix the plurality of magnetite concentrate particles, the acidic activator, and the plurality of aggregate particles in situ on the road bed surface to form a mixture. The system may further include a compressor that can compress the mixture. The system may optionally include equipment for loosening at least some of the assemblage of aggregate particles on the road bed. The system for use in stabilizing a road bed surface may optionally be a mobile system.

The present disclosure also provides a method for deicing a road bed surface. The method includes providing at least a portion of a road bed formed from a mixture, wherein the mixture includes a plurality of magnetite concentrate particles, a plurality of reactive aggregate particles including iron, and at least one acidic activator including phosphate anions. The plurality of magnetite concentrate particles may have a size of –200 mesh and a reactive iron concentration greater than 55 percent by weight. The plurality of reactive aggregate particles including iron may have a size in a range of +100 mesh to −1 inch mesh. At least a portion of the road bed includes the road bed surface with ice on at least a portion thereof. The method further includes directing radiation (e.g., non-ionizing radiation) to the road bed surface to effect heating of at least some reactive aggregate particles to reduce adhesion between the ice and the at least a portion of the road bed surface. The method may also include removing at least a portion of the ice from the road bed surface.

The present disclosure also provides a system for applying a patching material. The system may include a mixing apparatus; at least one controllable source for providing a plurality of magnetite concentrate particles to the mixing apparatus, at least one controllable source for providing a plurality of reactive aggregate particles including iron to the mixing apparatus, at least one controllable source for providing at least one acidic activator including phosphate anions to the mixing apparatus; at least one controllable outlet to discharge a mixture from the apparatus; and a compressing apparatus to compress the discharged mixture. The plurality of magnetite concentrate particles may have a size of −200 mesh and may have a reactive iron concentration greater than 55 percent by weight. The reactive iron concentration of the plurality of reactive aggregate particles may be in a range of 3 percent to 47 percent by weight and may have a size in a range of +100 mesh to −1 inch mesh. The mixture discharged from the mixing apparatus by the at least one controllable outlet may be formed from the plurality of magnetite concentrate particles, the plurality of reactive aggregate particles, and the at least one acidic activator including phosphate anions.

The present disclosure also provides another system for use in preparing patching material, the system including one or more components. The one or more components include a plurality of particles including iron; at least one acidic activator including phosphate anions; and a composition including polyvinyl alcohol.

BRIEF DESCRIPTION OF THE DRAWINGS

FIG. 5A is a flowchart representing a method for stabilizing a road bed surface that includes a plurality of aggregate particles according to the present disclosure.

DETAILED DESCRIPTION OF ILLUSTRATIVE EMBODIMENTS

Figure 1A:
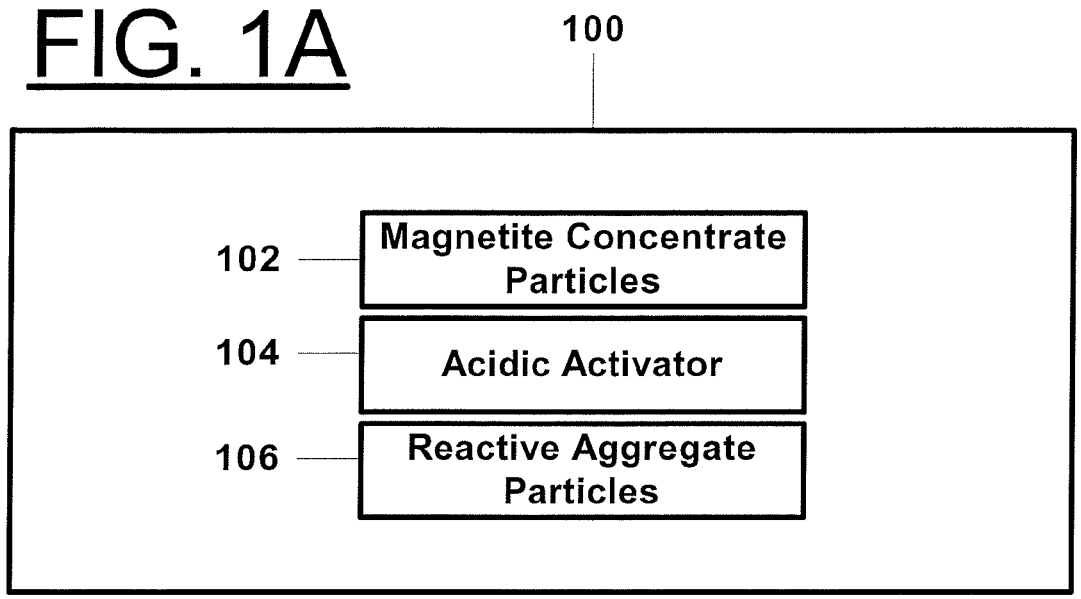
FIG. 1A is a block diagram representing a system or kit for use in preparing patching material according to the present disclosure.

Referring to FIG. 1A, one aspect of the present disclosure includes a system 100 that includes one or more components that can be useful in a preparing patching material. The one or more components include a plurality of magnetite concentrate particles 102, at least one acidic activator 104 including phosphate anions, a plurality of reactive aggregate particles 106, and optionally a plurality of filler particles (not shown as a separate block of the system of FIG. 1A).

In at least one embodiment, the present disclosure provides a mixture of such components. Such a mixture provides high quality construction and repair materials (e.g., road repair materials) provided to repair defects (e.g., potholes, road surface, etc.), for example, during inclement weather. The repair materials may avoid the high temperature and high energy requirement of current Portland cement manufacture. Also, for example, in at least one embodiment, the repair materials do not contain the oil-based binders as exist in asphalt.

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

Also herein, the recitations of numerical ranges by endpoints include all numbers subsumed within that range (e.g., 1 to 5 includes 1, 1.5, 2, 2.75, 3, 3.80, 4, 5, etc).

In the present disclosure, the mixture of reactive aggregate particles 106, magnetite concentrate particles 102 and at least one acidic activator 104 including phosphate anions allow binding of the mixture under various temperature conditions. In addition, the binding system itself produces a long-lasting bond that provides durability to the agglomerated aggregate. In some embodiments, the materials can be blended for direct application at a work site and the mixture directly placed in a roadway or construction application. The material then rapidly cures into a hard mass. One or more embodiments of the system do not require an oil-based binder system and may avoid the high temperature treatment associated with current Portland cement manufacture. One or more embodiments of the present disclosure may involve an acid-base reaction resulting in good adherence to, for example, existing concrete and metal structures. In one or more embodiments, a patching material may be useful on several types of road pavement surfaces such as asphalt, blacktop, concrete, gravel, class five, or others.

A possible source for the plurality of magnetite concentrate particles 102 is from taconite ore. Such taconite ore may be subjected to grinding and magnetic separation to produce the plurality of magnetite concentrate particles. The grinding and magnetic separation techniques may be repeated until the appropriate particle size and reactive iron concentration is obtained.

In addition, taconite rock differs from fly ash or silica in its mineral properties. Taconite rock is a ferruginous chert material which contains between 25 percent and 30 percent iron. This translates to a magnetite content between 34.5 percent and 41.4 percent in the pure taconite rock. In order to obtain this degree of iron composition, the rock may be recovered using hard rock mining techniques to first remove non-iron containing rock and then concentrate the product to increasing levels of iron content. Some taconite containing ore bodies have less than 20 percent iron and are upgraded using in-pit crushing and magnetic separation methods to generate a product of a particular iron content. When this rock is processed to make iron ore materials, the rock is ground to a face powder consistency and a combination of magnetic separation and silica flotation is used to produce a magnetite concentrate containing greater than 94 percent pure magnetite. The fine magnetite (e.g., magnetite concentrate) is active chemically in the phosphate binder system, but possesses little structural strength in this fine form. The coarser taconite rock that has undergone primary and secondary crushing combined with coarse magnetic separation may be used to produce an aggregate grade material with both fine angularity, chemical responsiveness to the phosphate-based activators, high density, and significant structural strength especially when compared to materials such as limestone, dolomite, and fly ash products, which may be alternate aggregate materials.

Taconite materials can occur as an oxidized material or an unoxidized material containing largely magnetite as the basic iron oxide form. The latter form may be used in one or more embodiments of the present invention.

The particle sizes are generally expressed in terms of a mesh size corresponding to the openings in a sieve. The mesh sizes referred to herein are standard sieve designations as published on page T848 of the Aldrich 2003-2004 Catalog/Handbook of Fine Chemicals. Larger sieve openings (1 in. to ¼ in.) have been designated by a sieve "mesh" size that corresponds to the size of the opening in inches. Smaller sieve "mesh" sizes of 3½ to 400 are designated by the number of openings per linear inch in the sieve. The following convention is used to characterize particle size by mesh designation: a "+" before the sieve mesh indicates the desired particles are retained by the sieve; a "−" before the sieve mesh indicates the desired particles pass through the sieve; typically 90 percent or more of the particles will lie within the indicated range. For example, if the particle size of a material is described as a range of −4+40 mesh, then at least 90 percent or more of the material will pass through a 4-mesh sieve (particles smaller than 4.76 mm) and at least 90 percent of the material will be retained by a 40-mesh sieve (particles larger than 0.420 mm). If a material is described as −40 mesh, then 90 percent or more of the material will pass through a 40-mesh sieve (particles smaller than 0.420 mm). This information is also provided on page T848 of the Aldrich 2003-2004 Catalog/Handbook of Fine Chemicals, incorporated herein by reference.

Table 1 shows a particle size distribution and corresponding mag iron content for particles that may be used in one or more embodiments of the present disclosure. Rod mill feed (crushed taconite ore that goes into the rod mill cobber circuit) may be subjected to crushing, grinding, and magnetic separation to produce cobber concentrate having an enriched mag iron content. The cobber concentrate may then be subjected to crushing, grinding, and magnetic separation to produce rougher concentrate having a higher mag iron content. Finally, the rougher concentrate may be subjected to crushing, grinding, magnetic separation, and silica flotation techniques to produce magnetite concentrate.

TABLE 1

Size distribution and magnetic iron concentration in rod mill feed, cobber concentrate, rougher concentrate, and magnetite concentrate.

Rod Mill Feed

| Size fraction | (unit) | Mesh Size | Weight (%) | Cumulative passing (%) | Mag Iron (%) | Silica (%) | NM iron (%) (non magnetic) |
|---|---|---|---|---|---|---|---|
| 26.5 | mm | 1 in. | 2.00 | 100.00 | 19.11 | 47.55 | 12.19 |
| 19 | mm | ¾ in. | 16.30 | 98.00 | 19.11 | 47.55 | 12.19 |
| 13.2 | mm | 0.530 in. | 20.90 | 81.70 | 19.11 | 47.55 | 12.19 |
| 9.5 | mm | ⅜ in. | 17.60 | 60.80 | 19.11 | 47.55 | 12.19 |
| 6.7 | mm | 0.265 in. | 16.50 | 43.20 | 19.11 | 47.55 | 12.19 |
| 3.35 | mm | No. 6 | 8.20 | 26.70 | 19.11 | 47.55 | 12.19 |
| 1.7 | mm | No. 12 | 5.80 | 18.50 | 17.46 | 50.02 | 12.94 |
| 850 | μm | No. 20 | 3.50 | 12.70 | 17.46 | 50.02 | 12.94 |
| 425 | μm | No. 40 | 2.20 | 9.20 | 18.98 | 41.74 | 15.32 |
| 212 | μm | No. 70 | 0.90 | 7.00 | 18.98 | 41.74 | 15.32 |
| 150 | μm | No. 100 | 1.30 | 6.10 | 28.18 | 39.15 | 9.97 |
| 75 | μm | No. 200 | 0.70 | 4.80 | 28.18 | 39.15 | 9.97 |
| 53 | μm | No. 270 | 0.20 | 4.10 | 26.95 | 39.85 | 10.05 |
| 45 | μm | No. 325 | 0.30 | 3.90 | 16.62 | 45.21 | 13.18 |
| 38 | μm | No. 400 | 0.50 | 3.60 | 16.62 | 45.21 | 13.18 |
| 25 | μm | No. 600 | 3.10 | 3.10 | 16.62 | 45.21 | 13.18 |
| Component grade | | | | | 19.05 | 47.32 | 12.35 |

| Size fraction | (unit) | Mesh Size | Weight (%) | Cumulative passing (%) | MagFe (%) | Silica (%) | NMFe (%) |
|---|---|---|---|---|---|---|---|

Cobber Concentrate

| 6.7 | mm | 0.265 in. | 15.73 | 100.00 | 26.42 | 38.86 | 9.70 |
| 3.35 | mm | No. 6 | 27.41 | 84.27 | 27.53 | 38.86 | 8.42 |
| 1.7 | mm | No. 12 | 20.79 | 56.86 | 30.12 | 38.55 | 7.28 |
| 850 | μm | No. 20 | 12.83 | 36.08 | 31.68 | 37.63 | 7.48 |
| 425 | μm | No. 40 | 7.01 | 23.25 | 34.66 | 33.71 | 8.74 |
| 212 | μm | No. 70 | 2.64 | 16.25 | 35.54 | 32.69 | 8.42 |
| 150 | μm | No. 100 | 3.51 | 13.61 | 49.49 | 19.91 | 5.28 |
| 75 | μm | No. 200 | 1.78 | 10.09 | 51.33 | 17.92 | 5.00 |
| 53 | μm | No. 270 | 0.58 | 8.32 | 58.90 | 10.71 | 2.99 |
| 45 | μm | No. 325 | 0.95 | 7.74 | 61.80 | 10.22 | 2.20 |
| 38 | μm | No. 400 | 1.42 | 6.79 | 60.92 | 11.00 | 3.00 |
| 25 | μm | No. 600 | 5.37 | 5.37 | 58.24 | 11.47 | 3.47 |
| Component grade | | | | | 32.96 | 34.77 | 7.68 |

Rougher Concentrate

| 1.7 | mm | No. 12 | 1.10 | 100.00 | 18.78 | 50.81 | 9.25 |
| 850 | μm | No. 20 | 7.05 | 98.90 | 20.67 | 48.73 | 9.36 |
| 425 | μm | No. 40 | 19.02 | 91.85 | 27.87 | 38.31 | 9.43 |
| 212 | μm | No. 70 | 11.76 | 72.83 | 30.92 | 35.69 | 9.30 |
| 150 | μm | No. 100 | 18.05 | 61.07 | 47.63 | 21.07 | 5.46 |
| 75 | μm | No. 200 | 8.23 | 43.02 | 50.30 | 18.89 | 5.07 |
| 53 | μm | No. 270 | 2.40 | 34.79 | 62.92 | 8.38 | 1.71 |
| 45 | μm | No. 325 | 2.36 | 32.39 | 63.70 | 8.28 | 0.79 |
| 38 | μm | No. 400 | 6.26 | 30.03 | 64.55 | 7.61 | 0.69 |
| 25 | μm | No. 600 | 23.77 | 23.77 | 63.99 | 5.60 | 0.68 |
| Component grade | | | | | 45.60 | 23.04 | 5.32 |

Magnetite Concentrate

| 212 | μm | No. 70 | 0.10 | 100.00 | 46.67 | 20.52 | 5.32 |
| 150 | μm | No. 100 | 3.36 | 99.90 | 47.30 | 20.00 | 5.28 |
| 75 | μm | No. 200 | 9.59 | 96.54 | 47.43 | 20.03 | 5.27 |
| 53 | μm | No. 270 | 6.86 | 86.95 | 65.42 | 5.85 | 1.34 |
| 45 | μm | No. 325 | 3.98 | 80.08 | 67.90 | 4.30 | 0.10 |
| 38 | μm | No. 400 | 18.35 | 76.10 | 69.67 | 3.08 | 0.08 |
| 25 | μm | No. 600 | 57.76 | 57.76 | 70.28 | 2.57 | 0.08 |
| Component grade | | | | | 66.75 | 5.24 | 0.84 |

In some embodiments of the present disclosure, the plurality of magnetite concentrate particles 102 can have a size of −200 mesh. The plurality of magnetite concentrate particles 102 may be even smaller than −200 mesh, such as −250 mesh, −300 mesh, or −400 mesh.

Further, the plurality of magnetite concentrate particles 102 can have a reactive iron concentration greater than 55 percent by weight. In other embodiments, the reactive iron concentration may be greater than 60 percent by weight or may be greater than 65 percent by weight.

As used herein, a reactive iron concentration is the weight concentration of iron in a form that is reactive with an acidic activator that includes phosphate anions. That is, the reactive iron concentration is the weight concentration of iron as magnetite, $Fe_3O_4$, and does not include other iron that may be present in the form of, for example, hematite, wüstite, or elemental iron.

For example, crude taconite ore produced from some taconite mines historically may assay at 22.1 percent by weight total magnetic iron (i.e., "Mag. Fe" or "mag iron"), but may have a total iron assay of 32.4 percent by weight. In other words, not all of the iron in taconite ore may be in a magnetic form. An important factor in assessing ore quality and estimating possible true plant recoveries is the magnetic iron concentration.

As is further described by Davis, "*Pioneering with Taconite*," Minnesota Historical Society (1964), Appendix 1, incorporated herein by reference, in the following excerpt: "The taconite of the east Mesabi is a hard, dense rock, composed largely of an intimate mixture of silicates with small magnetic crystals. Only the magnetite crystals contain sufficient iron to be of importance, and these constitute only about one-third of the weight of the taconite. Magnetite is only 72.4 percent iron, and therefore east Mesabi taconite contains only 20 to 25 percent iron in the magnetic form (72.4 divided by 3 equals 24.1). The silicates may add as much as 5 to 10 percent additional iron to the taconite, but most of it must be discarded as tailings in any processing operation that produces high-grade iron concentrate. For this reason the total iron content of the taconite is not of primary importance. It is only the iron that occurs as the mineral magnetite with which magnetic concentration processes are concerned. Since the chemical analysis of taconite does not indicate the percentage of iron which is present in the magnetic state, the Mines Experiment Stations's staff developed a method of securing the magnetic iron assay by using [a] magnetic tube machine . . . . The magnetic iron assay, or Mag. Fe as it is called, differs from the total iron assay, or total Fe, which can be determined by chemical analysis. The Mag. Fe in taconite is always lower than the total Fe. The difference depends upon the amount of hematite and other nonmagnetic iron compounds that are present in the sample."

In one or more embodiments, the weight percentage of the plurality of magnetite concentrate particles 102 relative to the total weight of all of the one or more components of the system 100 (e.g., the magnetite concentrate particles 102, the acidic activator 104, the reactive aggregate particles 106, and filler particles, if any) may be at least 5 percent, but may be 50 percent or less, 30 percent or less, 20 percent or less, or even 10 percent or less. In one or more embodiments, the weight percentage of the plurality of magnetite concentrate particles relative to the total weight of all of the one or more components of the system may be at most 50 percent, but may be 5 percent or greater, 15 percent or greater, or even 25 percent or greater. The weight percentage of the plurality of magnetite concentrate particles 102 relative to the total weight of all of the one or more components in the system may be 30 percent or less, and may be 5 percent or greater, 15 percent or greater, or even 25 percent or greater.

The at least one acidic activator 104 including phosphate anions can be one compound, which can be acidic in and of itself, or can include a mixture of one or more compounds that include phosphate-containing anions. For instance, the at least one acidic activator 104 including phosphate anions may be orthophosphoric acid (i.e., $H_3PO_4$), which is both acidic and includes phosphate anions. In other embodiments, the at least one acidic activator 104 including phosphate anions may include one or more acids different than orthophosphoric acid, such as acetic acid (i.e., $CH_3COOH$), in combination with one or more other compounds that provide the phosphate anions, such as phosphate salts. In still other embodiments, the at least one acidic activator 104 may include orthophosphoric acid in combination with one or more phosphate salts. In embodiments in which the acidic activator 104 does not include orthophosphoric acid, the one or more compounds that include phosphate anions, such as phosphate salts, may provide the phosphate anions to the acidic activator.

Examples of phosphate salts include, but are not limited to, sodium phosphate ($NaH_2PO_4$) and calcium phosphate ($CaHPO_4$), each of which is commercially available in numerous forms. For example, phosphate salts may be obtained in the form of triple superphosphate fertilizer pellets. The fertilizer pellets may be crushed and dissolved in one or more acidic activators with or without water. The phosphate salts may provide from 0 percent to 100 percent of the phosphate anions in the acidic activator. In one or more embodiments, the weight percentage of phosphate salts relative to the weight of the acidic activator 104 including phosphate anions may be 60 percent or less, 30 percent or less, or even 10 percent or less. In one or more embodiments, the weight percentage of phosphate salts relative to the weight of the acidic activator may be 0 percent or greater, 25 percent or greater, or even 60 percent or greater.

In some embodiments in which orthophosphoric acid is utilized as the at least one acidic activator 104, the orthophosphoric acid may be diluted with at least some water. Reagent grade orthophosphoric acid (about 85 weight percent solution) (i.e., without dilution) may be used. In one or more embodiments, the orthophosphoric acid concentration may be at least 20 percent, but may be 85 percent or less, 65 percent or less or even 50 percent or less. In one or more embodiments, the orthophosphoric acid concentration is 20 percent or more, 45 percent or more, or even 65 percent or more.

The one or more components of the system 100 in the present disclosure may optionally include a plurality of filler particles. The plurality of filler particles may have a size of −4 mesh. In one or more embodiments of the present disclosure, the plurality of filler particles may be even smaller, such as −6 mesh, −16 mesh, −35 mesh, or smaller. At least in one embodiment, the plurality of filler particles has a mesh size smaller than the mesh size of the plurality of reactive aggregate particles.

The plurality of filler particles may include a wide range of compositions. The plurality of filler particles may include sand, natural rock, byproducts of iron ore processing, or combinations thereof. In some embodiments, the plurality of filler particles may include iron in the form of elemental iron, wüstite, hematite, magnetite, siderite, goethite, or combinations thereof. The plurality of filler particles may also include tailings of iron ore processing. Tailings may be fine tailings (e.g., −20 mesh and smaller), more coarse tailings (e.g., −4 mesh and smaller), or combinations thereof.

In one or more embodiments, the weight percentage of the plurality of filler particles relative to the total weight of the one or more components of the system may be 70 percent or less, 40 percent or less, 25 percent or less, or even 15 percent or less. In one or more embodiments, the weight percentage of the plurality of filler particles relative to the weight of the total system may be at most 70 percent, but may be 0 percent or greater, 20 percent or greater, or even 40 percent or greater. The plurality of filler particles may be reactive with the at least one acidic activator 104 or may not be reactive (i.e., non-reactive filler particles) with the at least one acidic activator. The plurality of filler particles may include elastomers, rubber materials, and/or plastic materials (e.g., waste plastic materials), including, but not limited to ground rubber (e.g., tire rubber materials after grinding).

The one or more components of the system 100 in the present disclosure include the plurality of reactive aggregate particles 106 that includes iron. In some embodiments, the plurality of reactive aggregate particles 106 may have a reactive iron concentration that may be at most 47 percent by weight, but may be 3 percent or more, 7 percent or more, 15 percent or more, 25 percent or more, or 40 percent or more. In one or more embodiments, the plurality of reactive aggregate particles may have a reactive iron concentration that may be at least 3 percent by weight, but may be 47 percent or less, 40 percent or less, or 25 percent or less. The plurality of reactive aggregate particles may be obtained by processing taconite ore to enrich the magnetite concentration in the ore to a reactive iron concentration of 15 percent to 47 percent by weight (e.g., cobber concentrate, rougher concentrate). Such processing may include grinding to appropriate gradations and magnetic separation. In some embodiments, the plurality of reactive aggregate particles may be obtained from mined taconite aggregate (e.g., rod mill feed) containing appropriate levels of magnetite. In one or more embodiments, the reactive iron concentration of the plurality of reactive aggregate particles is in a range of 7 percent to 47 percent by weight. In one or more embodiments, the reactive iron concentration of the plurality of reactive aggregate particles is in a range of 15 percent to 47 percent by weight.

In one or more embodiments, the plurality of reactive aggregate particles 106 may include fine tailings, coarse tailings, cobber concentrate, rougher concentrate, or combinations thereof, that result from processing (grinding and separation) of mined taconite ore (e.g., rod mill feed). The plurality of reactive aggregate particles 106 may include unprocessed rod mill feed.

In some embodiments, the plurality of reactive aggregate particles 106 has a size in a range of +100 mesh to −1 inch mesh. For example, when the one or more components of the system 100 include a plurality of filler particles, the plurality of reactive aggregate particles 106 may have a size in a range of +6 mesh to −1 inch mesh. In some embodiments, the plurality of reactive aggregate particles 106 may have a size in a range of +6 mesh to −¾ inch mesh. In still other embodiments, the plurality of reactive aggregate particles 106 may have a size in a range of +6 mesh to −½ inch mesh (e.g., rod mill feed, cobber concentrate, etc.). In still other embodiments, the plurality of reactive aggregate particles 106 may have a size in a range of +50 mesh to −4 mesh (e.g., coarse tailings).

In one or more embodiments, the plurality of reactive aggregate particles 106 is in a range of 15 percent to 80 percent by weight relative to the total weight of all of the one or more components of the system 100. In one or more embodiments, the weight percentage of the plurality of reactive aggregate particles 106 relative to the total weight of all of the one or more components of the system 100 may be at least 15 percent by weight, but may be 80 percent or less, 60 percent or less, 45 percent or less, or even 35 percent or less. In one or more embodiments, the weight percentage of the plurality of reactive aggregate particles 106 relative to the total weight of all of the one or more components of the system 100 may be at most 80 percent, but may be 30 percent or greater, 45 percent or greater, or even 60 percent or greater. In at least one embodiment, when the plurality of reactive aggregate particles 106 have a size in a range of +6 mesh to −¾ inch mesh, the weight percentage of the plurality of reactive aggregate particles 106 relative to the total weight of all of the one or more components of the system 100 may be 15 percent by weight or more and may be 45 percent by weight or less.

In one or more embodiments, the plurality of reactive aggregate particles 106 may include a plurality of filler particles that include reactive iron (e.g., coarse tailings) and have a size of −4 mesh, or a smaller size, such as −6 mesh. In such embodiments, the plurality of reactive aggregate particles 106 may further include reactive aggregate particles 106 having a size in a range of +6 mesh to −½ inch mesh.

The use of reactive aggregate particles as a coarse aggregate component may allow some moderation of the overall binding reactions since the use of only fine magnetite concentrate particles may lead to a very difficult-to-control reaction rate that may cause poor workability of the patching material. In one or more embodiments of the present disclosure, the addition of modifiers such as fly ash, boric acid and other such agents may or may not be used.

In one or more embodiments, the sharp angular nature of, for example, taconite rock, substrate, and filler particles may provide superior bonding mechanisms due to interlocking of particles. The sharp angular nature of the rock, as may be employed, results from its mining and subsequent processing in a mineral recovery processing plant. The availability of enhanced surface area and particle angularity may allow better interaction with potential binder materials, may allow for densified packing of the aggregate assemblage, and may provide superior traction on road surfaces to conventional road patching or coating materials. In one or more embodiments, the plurality of reactive aggregate particles may participate in a reaction with the phosphate binding system and contribute to physical strength of the patching material.

Various applications for one or more embodiments (e.g., system 100) of the present disclosure are envisioned including, but not limited to pot hole filling mixtures, road bed top surface treatments, crack repair sections, and similar construction activities. Road repair includes all year round filling of potholes and road damage. New road construction is a possible application, as is general construction where, for example, concrete-like aggregate mixtures are traditionally used. One or more embodiments could also be used to construct shielding devices for various emf wave phenomena, or create magnetic fields for specialty applications.

The one or more embodiments of this system may be an alternative to asphalt and Portland cement bonded aggregate systems.

In one or more embodiments, the one or more components of the system 100 may be provided as a kit. In such a kit, the at least one acidic activator 104 may be provided separately from the plurality of magnetite concentrate particles 102 and the plurality of reactive aggregate particles 106. In one or more embodiments that optionally include a plurality of filler particles, the at least one acidic activator 104 may be provided separately from the optional plurality of filler particles (not shown as a separate block of the system of FIG. 1A). In certain embodiments, when the acidic activator 104 includes one or more phosphate salts, the phosphate salts may be provided separately from the at least one acidic activator.

In some embodiments of the present disclosure, the system 100 including one or more components may also include an elastomeric coating composition (not shown as a separate block of the system of FIG. 1A). Such an elastomeric coating composition may be provided in the aforementioned kit, provided separately from the at least one acidic activator 104, the plurality of magnetite concentrate particles 102, and the plurality of reactive aggregate particles 106. In one or more embodiments, a patching material can be surface-treated with a more expensive and traffic durable material for added resilience on a concrete surface and can serve as a low cost bottom filler material. The patching materials of the present disclosure, when coupled with an elastomeric coating or seal coat that may also contain taconite-based materials, may have additional utility than the patching material without the elastomeric coating.

When the kit includes a plurality of filler particles, an elastomeric coating composition may also be provided separately from the plurality of filler particles. An elastomeric coating composition may be a urethane-based or an epoxy-based polymer with an appropriate hardening agent and a plurality of coating filler aggregate particles (e.g., coarse tailings, reactive aggregate particles, pea gravel, etc.). For one or more embodiments, elastomeric coating compositions may be commercially available such as, for example, Concrete Crack Eliminator or Gel-Seal, each from Accuflex Coatings (Proctor, Minn.).

Figure 1B:
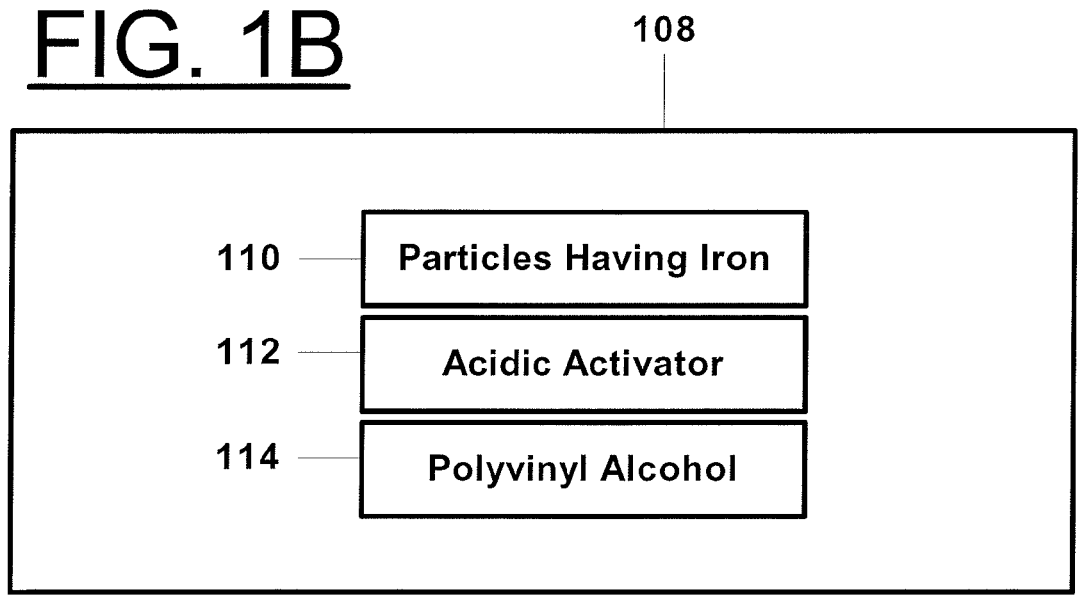
FIG. 1B is a block diagram representing a system or kit for use in preparing patching material according to the present disclosure.

Referring to FIG. 1B, another aspect of the present disclosure is a system 108, which includes one or more components, for use in preparing patching material. The one or more components include a plurality of particles including iron 110, at least one acidic activator 112 that includes phosphate anions, and a composition that includes polyvinyl alcohol 114.

In one or more embodiments the plurality of particles including iron 110 may include magnetite, such as taconite ore particles. In other embodiments, the plurality of particles including iron 110 may include magnetite concentrate particles as described herein, reactive aggregate particles as described herein, or mixtures thereof. In some embodiments, the plurality of particles including iron 110 may include particles of elemental iron or particles of oxidized iron.

The composition that includes polyvinyl alcohol 114 may be in various forms, e.g., a powdered form (e.g., powdered polyvinyl alcohol). Polyvinyl alcohol powder is commercially available, such as from Sigma-Aldrich, St. Louis, Mo. In one or more embodiments, the polyvinyl alcohol 114 is at least partially water soluble. In some embodiments, the composition may be a liquid solution of polyvinyl alcohol. In one or more embodiments, the composition may be an aqueous polyvinyl alcohol solution. The weight concentration of the composition including polyvinyl alcohol relative to the total weight of all of the one or more components in the system may be at least 0.1 percent, but may be 50 percent or less, 25 percent or less, or even 10 percent or less. The weight concentration of the composition including polyvinyl alcohol relative to the total weight of all of the one or more components in the system may be at most 50 percent, but may be 0.1 percent or greater, 5 percent or greater, or even 15 percent or greater. It should be understood that the composition including polyvinyl alcohol 114 may be used in any of the one or more embodiments described herein (e.g., FIGS. 1A, 2A, 3, 4, 6, and 7). For example, all ranges of compositions in the system 100 of FIG. 1A may be used in the system 108 of FIG. 1B which includes an amount of polyvinyl alcohol.

The at least one acidic activator 112 that includes phosphate anions may be like that as described in reference to the at least one acidic activator 104 in FIG. 1A. For example, the at least one acidic activator 112 may be one compound (e.g., phosphoric acid) that is both acidic and has phosphate anions or may be one or more compounds that are acidic (e.g., acetic acid) to which phosphate salts are added. Phosphate salts may include, for example, sodium phosphate and/or calcium phosphate.

One or more embodiments of the present invention that include a composition including polyvinyl alcohol may provide a flexible repair material (e.g., an inorganic road patch composite material), which may make the repair material less brittle to reduce cracking yet hard enough to provide long term wear when placed in, for example, road potholes.

In one or more embodiments, the system 108 for use in preparing patching material may include various weight percentages of dry powdered forms of polyvinyl alcohol added to, for example, iron ore containing magnetite prior to the addition of an acidic activator (e.g., phosphoric acid). In one or more embodiments, the higher the weight percentage of polyvinyl alcohol, the more flexible the iron phosphate road patch composite becomes. For example, weight percentages of from 0.1 percent to 50 percent polyvinyl alcohol, relative to the total weight of the one or more components of the system, can be added to a mixture of ground up iron ore (e.g., magnetite-bearing iron ore) and phosphoric acid to form a flexible iron phosphate road patch material. In one or more embodiments, the higher the concentration of the phosphoric acid (30 percent (diluted with 70% water) to 100 percent (undiluted)) added to the ground up iron ore and powdered polyvinyl alcohol mixture, the faster the hardening time becomes.

In one or more embodiments, a composition that includes polyvinyl alcohol 114 may include a fiber form of polyvinyl alcohol. Various grades of dry powdered polyvinyl alcohol have various degrees of water solubility. The grade of polyvinyl alcohol used can be partially water soluble. Although not wishing to be bound by theory, this attribute is postulated as being an important factor in the formation of a homogenous flexible iron phosphate road patch composite prepared with these components. Although not wishing to be bound by theory, the polyvinyl alcohol may, in one or more embodiments, react partially with the acid in the binder system to form a slightly modified organic molecule.

Systems of the present disclosure that include polyvinyl alcohol may provide a repair material that can, for example, be cut in half with a hack saw without breaking apart. With this attribute, this class of composite materials might well be used in a wide variety of applications in addition to road patches.

This class of flexible iron phosphate road patch composite materials may replace standard tar-type road patch materials to provide a superior road patch composite. The systems of the present disclosure that include polyvinyl alcohol may provide some advantages over a standard tar-type road patch material, including reduced expense, a longer life, reduced tendency to crack, improved adherence to potholes present in roads and highways made of a variety of materials, and lack of the intense tar odor which may provide easier application by workers. In one or more embodiments, the system of the present disclosure that includes polyvinyl alcohol can also be applied where water is present in the pothole and still maintain good adhesion to the surrounding cement or blacktop.

In one or more embodiments, the one or more components of the system 108 may be provided as a kit. In such a kit, the at least one acidic activator 112 may be provided separately from the plurality of particles having iron 110 and the polyvinyl alcohol 114. In one or more embodiments that optionally include a plurality of filler particles, the at least one acidic activator 112 may be provided separately from the plurality of filler particles (not shown as a separate block of the system of FIG. 1B). In certain embodiments, when the acidic activator 112 includes one or more phosphate salts, the phosphate salts may be provided separately from the at least one acidic activator.

In some embodiments of the present disclosure, the system 108 including one or more components may also include an elastomeric coating composition (not shown as a separate block of the system of FIG. 1B). Such an elastomeric coating composition may be provided in the aforementioned kit, provided separately from the at least one acidic activator 112, the plurality of particles having iron 110, and the polyvinyl alcohol 114. In one or more embodiments, a patching material can be surface-treated with a more expensive and traffic durable material for added resilience on a concrete surface and can serve as a low cost bottom filler material (e.g., fill bottom of a hole with another material on top thereof). The patching materials of the present disclosure, when coupled with an elastomeric coating or seal coat that may also contain taconite-based materials, may have even greater utility than the patching material without the elastomeric coating.

Figure 2A:
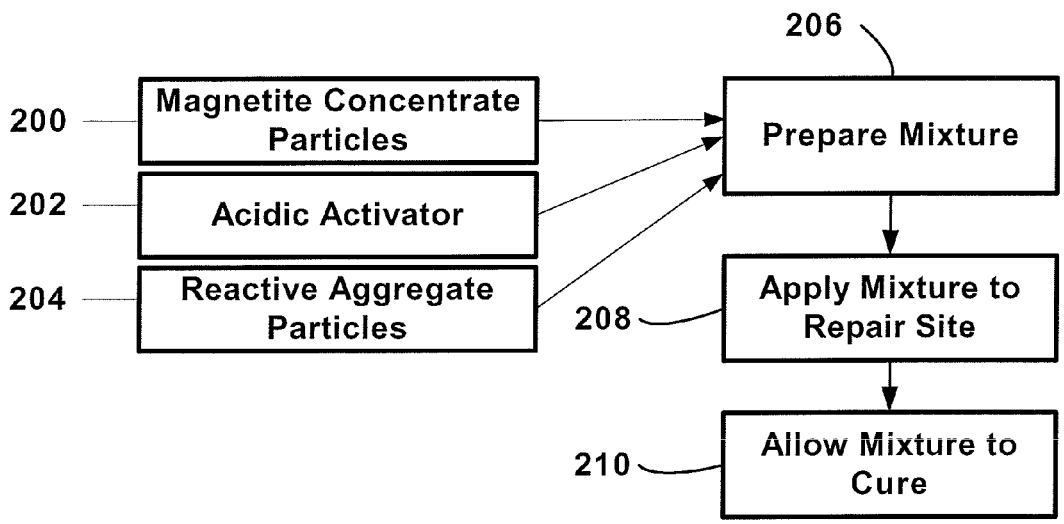
FIG. 2A is a flowchart representing a method for applying patching material according to the present disclosure.

Referring to FIG. 2A, another aspect of the present disclosure is a method for applying a patching material. The method includes preparing a mixture 206. The mixture includes a plurality of magnetite concentrate particles 200, at least one acidic activator 202 that includes phosphate anions, and a plurality of reactive aggregate particles 204. In one or more embodiments, the mixture may also optionally include a plurality of filler particles (not shown as a separate block of the system of FIG. 2A). The plurality of magnetite concentrate particles 200 may have a size of −200 mesh. Further, the plurality of magnetite concentrate particles 200 may have a reactive iron concentration greater than 55 percent by weight. The at least one acidic activator 202 may include phosphate anions that may be present in the acidic activator 202 itself (e.g., orthophosphoric acid), may be provided in the acidic activator 202 by the addition of one or more phosphate salts (e.g., sodium phosphate, calcium phosphate). In some embodiments, the at least one acidic activator 202 may be orthophosphoric acid with one or more phosphate salts. If present in the mixture, a plurality of filler particles may have a size of −4 mesh. The plurality of reactive aggregate particles 204 includes iron, wherein the reactive iron concentration of the plurality of reactive aggregate particles 204 may be in a range of 3 percent to 47 percent by weight. The plurality of reactive aggregate particles 204 may have a size in a range of +100 mesh to −1 inch mesh. The plurality of reactive aggregate particles 204 may be in a range of 15 percent to 80 percent by weight relative to the total weight of the mixture (i.e., the magnetite concentrate particles 200, the at least one acidic activator 202, reactive aggregate particles 204, and filler particles, if present). The method further includes applying the mixture to a repair site 208 and allowing the mixture to cure 210.

In one or more embodiments, preparing the mixture 206 may include mixing the at least one acidic activator 202 including phosphate anions and the plurality of magnetite concentrate particles 200, followed by adding the plurality of reactive aggregate particles 204. A plurality of filler particles may optionally be added. In the mixture, the plurality of reactive aggregate particles 204 may participate in a reaction with the at least one acidic activator 202 to form a durable, hard agglomerated mass of aggregate and iron phosphate that can be utilized in various applications (e.g., construction applications). The various applications include, but are not limited to, pothole filling mixtures, road bed top surface treatments, crack repair sections, and other construction applications. Road repair includes, but is not limited to, all year round filling of potholes and other road damage as well as new road construction. In still more embodiments, applications include general construction where concrete-like aggregate mixtures are traditionally used and could be used to construct shielding devices for various electromagnetic field (i.e., emf) wave phenomena. It should be noted that in one or more embodiments of the present disclosure, the relative concentrations of the one or more components may be varied depending on the ultimate repair site and application of the mixture (e.g., crack repair, pot hole, road repair, road bed construction, etc.). It should further be noted that different weight percentages of the various components may provide one or more different advantages (e.g., structural integrity, ability to fill small repairs or void spaces, economics, etc.). It should be noted that the descriptions of all of the one or more components of the system 100 of FIG. 1A also apply to the method of FIG. 2A. For example, all ranges of compositions and particle sizes and/or other characteristics in the system 100 of FIG. 1A may be used in the method of FIG. 2A.

In one or more embodiments, the plurality of reactive aggregate particles 204 includes reactive aggregate particles having a size in a range of +6 mesh to −½ inch mesh. In some embodiments, the plurality of reactive aggregate particles includes a plurality of filler particles comprising reactive iron and having a size of −4 mesh. In embodiments including a plurality of reactive aggregate particles includes a plurality of filler particles comprising reactive iron and having a size of −4 mesh, the plurality of reactive aggregate particles may include reactive aggregate particles having a size in a range of +6 mesh to −½ inch mesh.

Figure 2B:
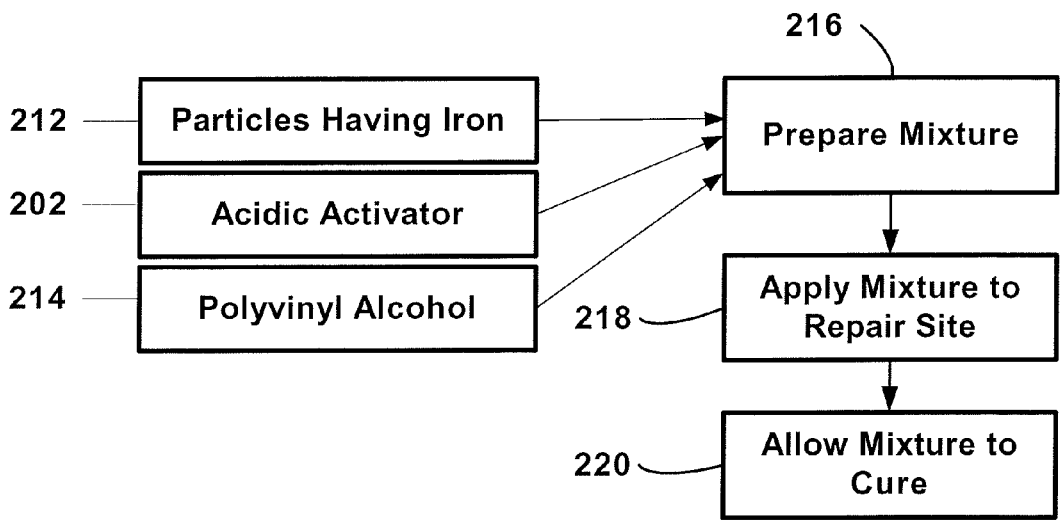
FIG. 2B is a flowchart representing a method for applying patching material according to the present disclosure.

Referring to FIG. 2B, another aspect of the present disclosure is a method for applying a patching material. The method includes preparing a mixture 216. The mixture includes a plurality of particles having iron 212, at least one acidic activator 202 that includes phosphate anions, and polyvinyl alcohol 114. In one or more embodiments, the mixture may also optionally include a plurality of filler particles (not shown as a separate block of the system of FIG. 2B). The at least one acidic activator 202 may include phosphate anions that may be present in the acidic activator 202 itself (e.g., orthophosphoric acid), may be provided in the acidic activator 202 by the addition of one or more phosphate salts (e.g., sodium phosphate, calcium phosphate). In some embodiments, the at least one acidic activator 202 may be orthophosphoric acid with one or more phosphate salts. If present in the mixture, a plurality of filler particles may have a size of −4 mesh. The method further includes applying the mixture to a repair site 218 and allowing the mixture to cure 220.

In one or more embodiments, preparing the mixture 216 may include mixing the polyvinyl alcohol 214 and the plurality of particles having iron 212, followed by adding the at least one acidic activator 204 having phosphate anions. A plurality of filler particles may optionally be added. It should be noted that the descriptions of all of the one or more components of the system 108 of FIG. 1B also apply to the method of FIG. 2B. For example, all ranges of compositions and particle sizes and/or other characteristics in the system 108 of FIG. 1B may be used in the method of FIG. 2B.

Figure 3:
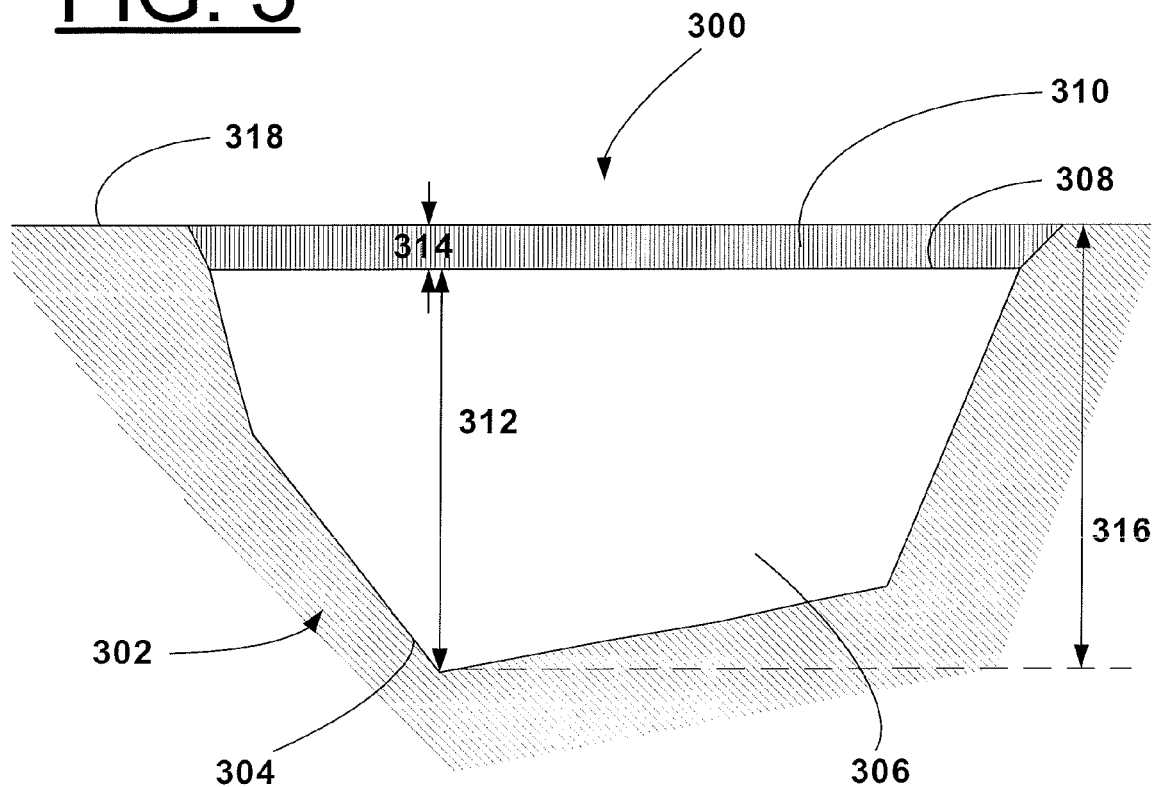
FIG. 3 is an illustration of a repair system for use in patching a repair site having at least one surface according to the present disclosure.

Referring to FIG. 3, another aspect of the present disclosure is a repair system 300 for use in patching a repair site 302 having at least one surface 304. The repair system 300 includes a mixture 306 applied on the at least one surface 304 of the repair site 302. It should be noted that the descriptions of all of the one or more components of the system 100 of FIG. 1A or system 108 of FIG. 1B may also apply to the mixture 306 of FIG. 3. For example, all ranges of compositions and particle sizes and/or other characteristics in the system 100 of FIG. 1A or the system 108 of FIG. 2A may be used in the mixture 306 of FIG. 3. For example, the mixture 306 may include a plurality of magnetite concentrate particles having a size of −200 mesh. The plurality of magnetite concentrate particles may have a reactive iron concentration greater than 55 percent by weight. The mixture 306 may also include at least one acidic activator that includes phosphate anions. The mixture 306 further includes a plurality of reactive aggregate particles that include iron, wherein the reactive iron concentration of the plurality of reactive aggregate particles may be in a range of 3 percent to 47 percent by weight.

The plurality of reactive aggregate particles may, for example, have a size in a range of +100 mesh to −1 inch mesh. The plurality of reactive aggregate particles may be in a range of 15 percent to 80 percent by weight relative to the total weight of the mixture 306 (e.g., magnetite concentrate particles, at least one acidic activator, and reactive aggregate particles).

Applying the mixture 306 on the at least one surface 304 of the repair site 302 results in an exposed mixture surface 308. The repair system 300 further includes at least one elastomeric coating 310 applied on the mixture 306 (e.g., on the exposed mixture surface 308).

Mixture 306 of the repair system 300 applied to the at least one surface 304 of the repair site 302 has a maximum first thickness 312, which is the maximum thickness measured from the at least one surface 304 of the repair site 302 to the exposed mixture surface 308. In the present disclosure, the maximum first thickness 312 may be described as the depth of the repair site 302 from a plane defined by the exposed mixture surface 308 to the deepest portion of the repair site 302 measured in a direction perpendicular to the plane defined by the surface grade 318 surrounding the repair site 302 (e.g., the road bed surface around a pothole or crack). The elastomeric coating 310 having a second thickness 314 may be applied on the exposed mixture surface 308. In the present disclosure, the second thickness 314 may be described as the distance between the exposed mixture surface 308 and the surface of the elastomeric coating 310 measured in a direction perpendicular to the plane of the surface grade 318 surrounding the repair site 302 and in a location proximate to or in the same location as the maximum first thickness 312.

In one or more embodiments, the maximum first thickness 312 is greater than or equal to 90 percent of a total thickness 316 of the maximum first thickness 312 and second thickness 314. In other embodiments, the maximum first thickness 312 is greater than or equal to 95 percent of a total thickness 316 of the maximum first thickness 312 and second thickness 314. In still other embodiments, the maximum first thickness 314 is greater than or equal to 98 percent of a total thickness 316 of the maximum first thickness 312 and second thickness 314.

In the present disclosure, a repair site 302 could be any defect in a concrete, asphalt, or cement surface. For example, such a repair site may be a pothole or cracks in a roadway, sidewalk, driveway, airport runways, and friction courses in highway construction. One or more embodiments may be used in, for example, foundation repair. A repair site may also include larger portions of roadways, including, but not limited to, entire roadbed surfaces (e.g., from edge to edge). The repair site (e.g., pothole) does not need to be free of standing water, moisture, or other aggregate materials for application of the patching material according to one or more embodiments of the present invention.

In the present disclosure, the relative amounts of mixture 306 and elastomeric coating 310 may alternatively be measured volumetrically. For example, in one or more embodiments, normal attrition of a road repair material formed by one or more mixtures may be reduced by a repair system of the present disclosure, whereby the plurality of reactive aggregate particles (e.g., taconite-based particles) is used in a manner using combined inorganic binders and the natural rock reactivity with, for example, phosphoric acid and/or phosphoric salts for approximately 90-95 percent of the repair volume. The last 10 percent of the repair may be made using an organic binder system made from, for example, urethane (containing feldspar and titanium oxide) with an appropriate hardening agent. In other words, in one or more embodiments, the mixture 306 applied on the at least one surface 304 of the repair site 302 may fill about 90-95 percent of the volume of the repair site 302, and the elastomeric coating 310 may fill about 5-10 percent of the volume of the repair site 302.

After the elastomeric coating 310 is applied to the exposed mixture surface 308, then optional coating filler particles (e.g., more taconite aggregate having a particular particle consistency (e.g., −¼ inch mesh) (not shown as a separate component of the system of FIG. 3)) may be added to this organic binding layer (e.g., the elastomeric coating 310). For example, an organic binder system may be provided by using, for example, an epoxy-based sealer which reacts at various temperatures and an addition of fine aggregate in the sealer coating. The fine aggregate could be added while the epoxy was curing and can become part of the epoxy-based coating. This combined system (e.g., the elastomeric coating 310 and the mixture 306 that includes a plurality of reactive aggregate particles, an acidic activator including phosphate anions, and a plurality of magnetite concentrate particles) may allow long-lasting or permanent road repairs to be made that may greatly lower highway maintenance costs. It should be noted that the descriptions of filler particles in reference to the systems 100 of FIG. 1A and system 108 of FIG. 1B may also apply to the optional coating filler particles of FIG. 3.

A repair may proceed in the following manner. For example, a mixture of reactive aggregate particles, at least one acidic activator including phosphate anions, and a plurality of magnetite concentrate particles (and optional filler particles) may be blended and placed in a repair site. The patch (e.g., the mixture in the repair site) may be allowed to set. After approximately 2 hours, an epoxy- or urethane-based sealant may be placed over the repair to bring the repair to grade and then while the epoxy- or urethane-based sealant cures, fine aggregate chips may be placed on top of the repair (e.g., on top of the sealant). The chips may become part of the epoxy- or urethane-based coating. As envisioned, in at least one embodiment, the repair would be made using roughly 95 percent of the hole (i.e., repair site) volume filled with the mixture of reactive aggregate particles, the at least one acidic activator including phosphate anions, and the plurality of magnetite concentrate particles (and optional filler particles). The epoxy- or urethane-based sealer combined with chips may bring the final repair to grade.

Figure 4:
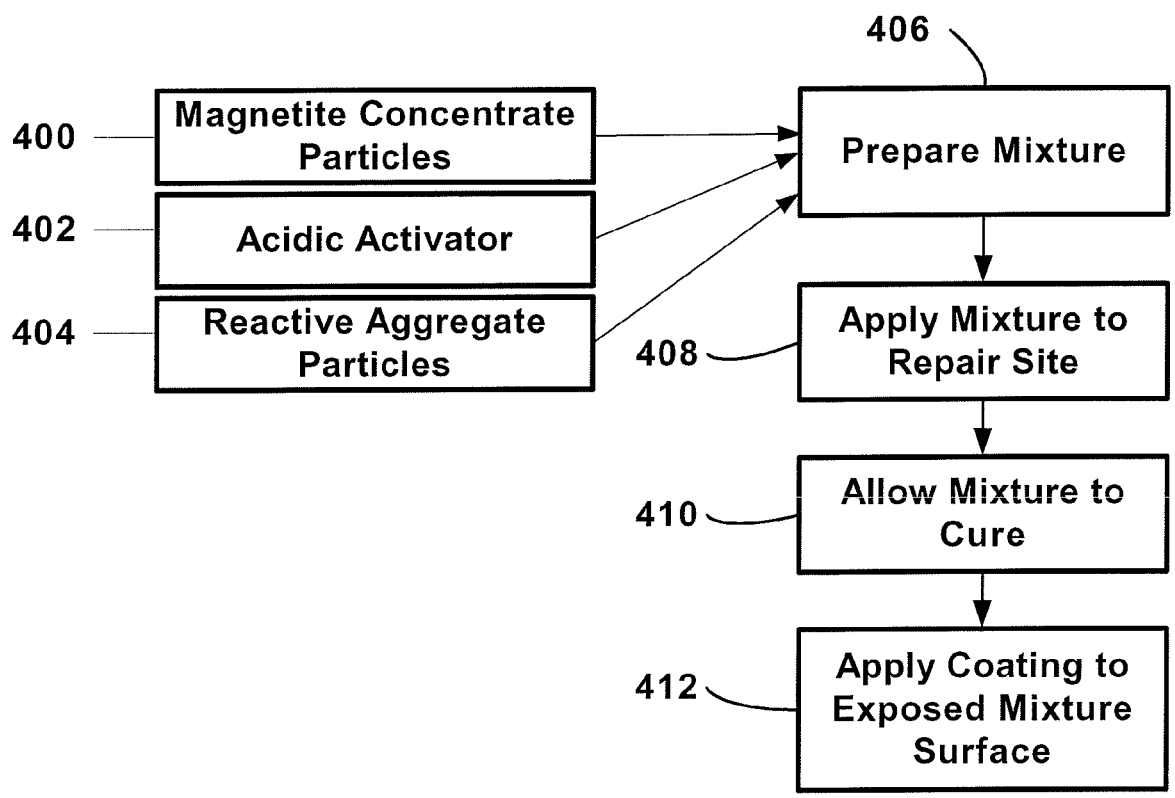
FIG. 4 is a flowchart representing a method for applying patching material according to the present disclosure.

Referring to FIG. 4, another aspect of the present disclosure is a method for patching a repair site having at least one surface. The method includes preparing a mixture 406 that includes a plurality of magnetite concentrate particles 400, at least one acidic activator 402, and a plurality of reactive aggregate particles 404. It should be noted that the descriptions of all of the one or more components of the system 100 of FIG. 1A or system 108 of FIG. 1B may also apply to the components used in the method of FIG. 4. For example, all ranges of compositions and particle sizes and/or other characteristics in the system 100 of FIG. 1A or the system 108 of FIG. 2A may be used in the method of FIG. 4. For example, the plurality of magnetite concentrate particles 404 may have a size of −200 mesh and may have a reactive iron concentration greater than 55 percent by weight. The mixture also includes at least one acidic activator 402 that includes phosphate anions, which may be present in the at least one acidic activator 402 itself (e.g., phosphoric acid) or may be provided by addition of at least one phosphate salt. The mixture further includes a plurality of reactive aggregate particles 404 that includes iron. In one or more embodiments, the reactive iron concentration of the plurality of reactive aggregate particles 404 is in a range of 3 percent to 47 percent by weight. Also, for example, the plurality of reactive aggregate particles 404 may have a size in a range of +100 mesh to −1 inch mesh. The plurality of reactive aggregate particles 404 may be in a range of 15 percent to 80 percent by weight relative to the total weight of the components in the mixture (e.g., magnetite concentrate particles 400, at least one acidic activator 402, and reactive aggregate particles 404). The mixture may produce a dense slurry similar to the consistency of wet cement. The slurry can conform to the shape of a container (e.g., a pothole) and "set" into a rock-hard like material. The consistency of the mixture and the setting time can be tailored according to the application by varying the reactive aggregate composition, particle size distribution, reactive iron content, and concentration of the acidic activator.

The method further includes applying the mixture to the repair site 408 having at least one surface. Applying the mixture having a maximum first thickness to the at least one surface of the repair site 408 results in an exposed mixture surface. The method further includes allowing the mixture to cure 410 (e.g., cure at a particular time and temperature, such as ambient temperature) and applying (e.g., rolling, spreading, using any device or applicator suitable to spread, including rollers, spreaders, paint application devices) at least one elastomeric coating to the exposed mixture surface 412 (e.g., to a second thickness on at least a portion of the exposed mixture surface). The maximum first thickness is the maximum measurement from the exposed mixture surface to the at least one surface of the repair site. In one or more embodiments, the maximum first thickness is greater than or equal to 90 percent of a total thickness of the maximum first thickness and second thickness.

In the present disclosure, an elastomeric coating may optionally further include a plurality of coating filler particles that provide additional texture to the cured elastomeric coating surface. In one or more embodiments, the plurality of coating filler particles is added to the elastomeric coating before or during the curing of the elastomeric coating. In some embodiments, the plurality of coating filler particles may be added to the elastomeric coating after the elastomeric coating is applied to at least a portion of the mixture. In still other embodiments, the elastomeric coating includes no coating filler particles. In one or more embodiments, the coating filler particles are fine, having a size of −¼ inch mesh, −3½ mesh, or smaller. The composition of the coating filler particles may be the same as the composition described herein for the plurality of filler particles.

Referring to FIG. 5A, another aspect of the present disclosure is a method for stabilizing a road bed surface that includes a plurality of aggregate particles. Such a road bed stabilizing method includes providing a road bed surface 500 (e.g., a dusty, rural stone or gravel road) and providing a plurality of magnetite concentrate particles to the road bed surface 502. Providing a road bed surface 500 may include locating an already existing road bed surface in need of stabilization. It should be noted that the descriptions of all of the one or more components of the system 100 of FIG. 1A or system 108 of FIG. 1B may also apply to corresponding components used in the method of FIG. 5A. For example, the descriptions of the plurality of magnetite concentrate particles and at least one acidic activator in reference to FIGS. 1A and 1B may also apply to the plurality of magnetite concentrate particles and at least one acidic activator used in the method of FIG. 5A. For example, the plurality of magnetite concentrate particles may have a size of −200 mesh. In one or more embodiments, the plurality of magnetite concentrate particles may have a size greater than −200 mesh (e.g., −100 mesh, −50 mesh, etc.).

The method for stabilizing a road bed surface further includes providing at least one acidic activator 504 that includes phosphate anions to the plurality of magnetite concentrate particles. The method further includes intermixing 506 the plurality of magnetite concentrate particles, the acidic activator, and the plurality of aggregate particles in situ on the road bed surface to form a mixture. The method includes compressing the mixture 508. In one or more embodiments, the method does not include spraying oil or other organic binders to hold the loose assemblage of aggregate materials together. One or more embodiments include forming an iron phosphate binder which may add stability to the otherwise loose aggregate particles.

The provided road bed surface 500 that includes a plurality of aggregate particles may be a dusty road, such as, for instance, a rural gravel road or a road including stone or gravel. The road bed surface may optionally be treated by further loosening the at least some of the assemblage of aggregate particles on the road bed. The loosening may be accomplished by known methods and with known equipment, such as a road grader, rake, etc.

A plurality of magnetite concentrate particles may be provided to the road bed surface 502 with a dry spreader. Such a plurality of magnetite concentrate particles may have a reactive iron concentration of greater than 55 percent by weight. In one or more embodiments, the plurality of magnetite concentrate particles is spread over a majority of the width of a lane in the road, and may even be spread over the entire road width (i.e., from edge to edge).

Providing (e.g., applying) the at least one acidic activator 504 may be accomplished by any known means, such as spraying. In some embodiments, the at least one acidic activator is orthophosphoric acid. In one or more embodiments, the at least one acidic activator that includes phosphate anions may be applied to the plurality of magnetite concentrate particles 504 before or while providing a plurality of magnetite concentrate particles on the road bed surface 502. In one or more embodiments, the at least one acidic activator may include a phosphate salt, which may or may not be fully dissolved when the at least one acidic activator is applied to the plurality of magnetite concentrate particles.

Any known apparatus may be used to intermix 506 the plurality of magnetite concentrate particles with the at least one acidic activator and the plurality of road bed aggregate particles. In one or more embodiments, such intermixing 506 is accomplished in situ on the road surface by, for example, a rake or other appropriate equipment. The mixture of road bed aggregate particles, magnetite concentrate particles, and the at least one acidic activator is then compressed into the road bed surface 508 by, for example, a roller or other similar road compressing or smoothing equipment.

Figure 5B:
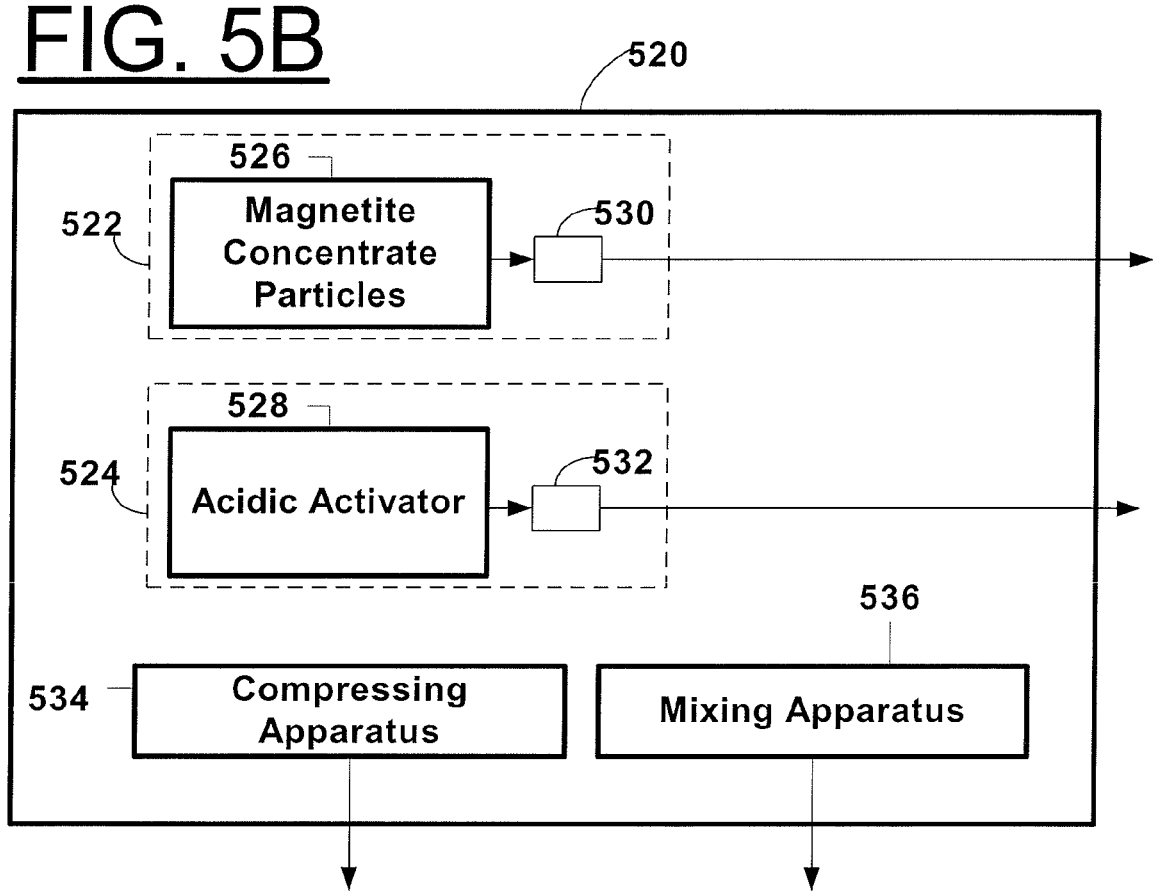
FIG. 5B is a block diagram representing a system for applying a patching material according to the present disclosure.

Referring to FIG. 5B, another aspect of the present disclosure is a system 520 for use in stabilizing a road bed surface that includes a plurality of aggregate particles. Such a system for use in stabilizing a road bed surface may include a controllable source 522 of magnetite concentrate particles 526 that utilizes a magnetite concentrate particles controller 530. The controllable source 522 is capable of providing the plurality of magnetite concentrate particles 526 to the road bed surface. It should be noted that the descriptions of all of the one or more components of the system 100 of FIG. 1A or system 108 of FIG. 1B may also apply to corresponding components used in the system 520 of FIG. 5B. For example, the descriptions of the plurality of magnetite concentrate particles and at least one acidic activator in reference to FIGS. 1A and 1B may also apply to the plurality of magnetite concentrate particles and at least one acidic activator in the system 520 of FIG. 5B. For example, the plurality of magnetite concentrate particles 526 may have a size of −200 mesh. In one or more embodiments, the plurality of magnetite concentrate particles 526 may have a size greater than −200 mesh (e.g., −100 mesh, −50 mesh, etc.). The system 520 for use in stabilizing a road bed surface further includes a controllable source 524 of at least one acidic activator 528 that includes phosphate anions. The controllable source 524 utilizes an acidic activator controller 532. The controllable source 524 is capable of providing the at least one acidic activator 528 that includes phosphate anions to the plurality of magnetite concentrate particles 526. The system further includes a mixing apparatus 536 that can intermix the plurality of magnetite concentrate particles 526, the acidic activator 528, and the plurality of aggregate particles (not shown) in situ on the road bed surface to form a mixture. The system 520 further includes a compressing apparatus 534 that can compress the mixture.

The system 520 may further optionally include equipment (not shown) for loosening at least some of the assemblage of aggregate particles on the road bed. The equipment for loosening may include known equipment, such as a road grader.

The controllable source 522 of magnetite concentrate particles 526 that can provide a plurality of magnetite concentrate particles 526 to a road bed surface may include a dry spreader. Such a plurality of magnetite concentrate particles 526 may have a reactive iron concentration of greater than 55 percent by weight. In one or more embodiments, the system 520 may spread the plurality of magnetite concentrate particles over a majority of the width of a lane in the road, and may even be spread over the entire road width (i.e., from edge to edge).

The controllable source 524 of at least one acidic activator 528 that includes phosphate anions, capable of providing the at least one acidic activator 528 that includes phosphate anions to the plurality of magnetite concentrate particles 526, may include a nozzle (e.g., a spray nozzle). In some embodiments, the at least one acidic activator 528 is orthophosphoric acid. In one or more embodiments, the system 520 may provide the at least one acidic activator 528 that includes phosphate anions to the plurality of magnetite concentrate particles 526 before or while providing a plurality of magnetite concentrate particles on the road bed surface. In other words, the materials flowing through the system as represented by arrows in FIG. 5B leaving controllers 530 and 532 may be mixed prior to or after leaving the system 520, and prior to or after contacting the road bed surface.

The system 520 may include any mixing apparatus 536 to intermix the plurality of magnetite concentrate particles 526 with the at least one acidic activator 528 and the plurality of road bed aggregate particles. In one or more embodiments, the system 520 may include a mixing apparatus 536 (e.g., a rake or other appropriate equipment) that may be capable of accomplishing the intermixing in situ on the road surface. In one or more embodiments of the system 520, the compressing apparatus 534 may include a roller or other similar road compressing or smoothing equipment capable of compressing the mixture of road bed aggregate particles, magnetite concentrate particles 526, and the at least one acidic activator 528 into the road bed surface.

In some embodiments, the system 520 for use in stabilizing a road bed surface may be a mobile system. In one or more embodiments, the system 520 may include one or more vehicles with some or all of the controllable sources 530 and 532, mixing apparatus 536, compressing apparatus 534, and optional loosening equipment (not shown) on each of the one or more vehicles.

Figure 6:
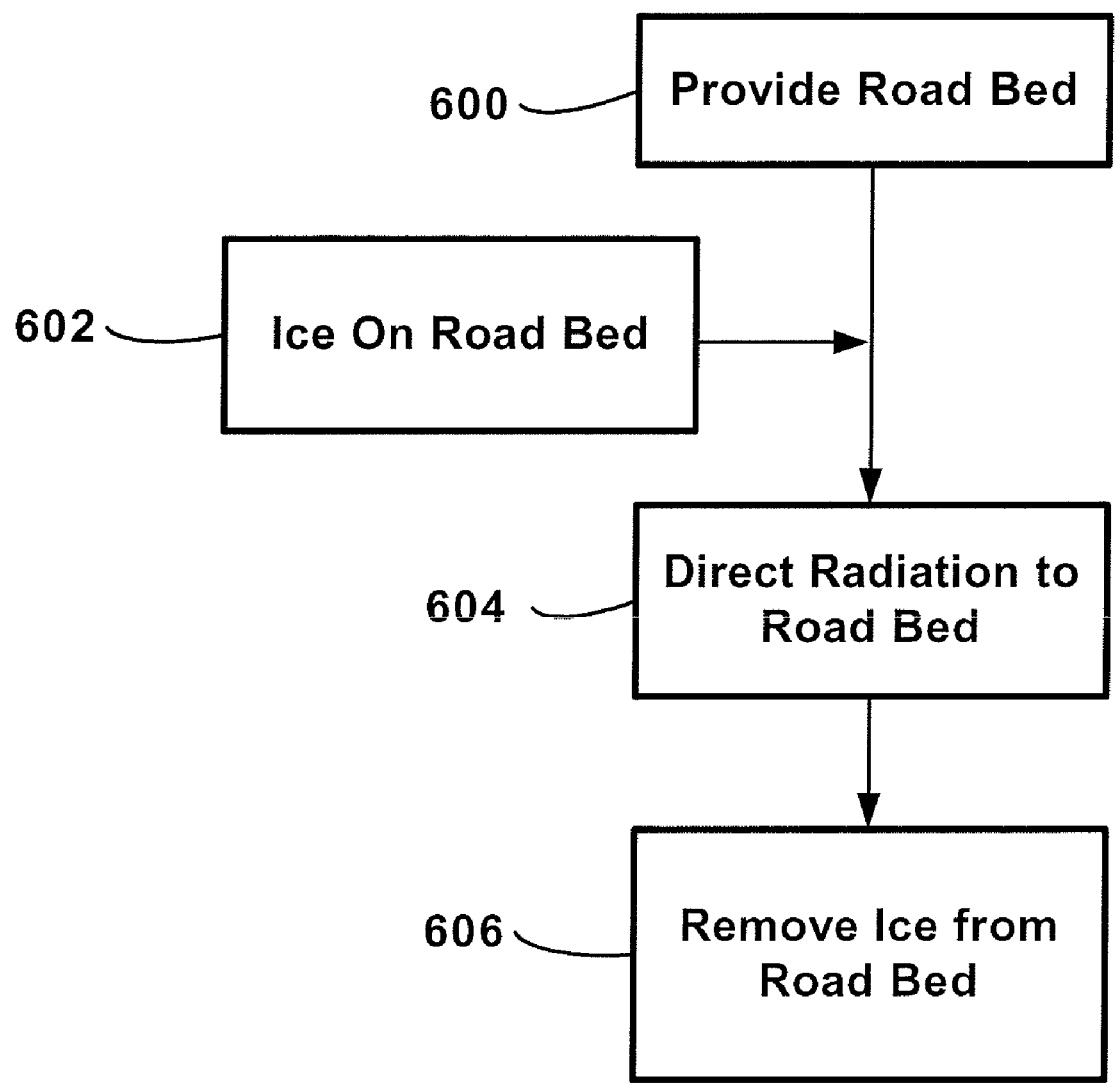
FIG. 6 is a flowchart representing a method for deicing a road bed surface according to the present disclosure.

Referring to FIG. 6, another aspect of the present disclosure is a method for deicing a road bed surface. Such a deicing method includes providing at least a portion of a road bed 600 formed from a mixture such as that described herein in reference to the systems of FIG. 1A and FIG. 1B. For example, the mixture may include a plurality of magnetite concentrate particles, a plurality of reactive aggregate particles including iron, and at least one acidic activator that includes phosphate anions. The plurality of magnetite concentrate particles in the mixture may have a reactive iron concentration greater than 55 percent by weight. The plurality of reactive aggregate particles including iron in the mixture may have a size in a range of +100 mesh to −1 inch mesh. In one or more embodiments, the road bed surface may further include an elastomeric coating. The at least a portion of a road bed includes the road bed surface with ice on at least a portion thereof. Ice may be formed on the road bed surface 602 due to, for example, cold weather (e.g., temperatures at which water may freeze) and/or precipitation (e.g., rain, freezing rain, drizzle, sleet, hail, snow, etc.). In the present disclosure, ice may also refer to snow (e.g., snow compacted on a road bed surface). The method further includes directing radiation to the road bed surface 604 (e.g., through the ice thereon) to effect heating of at least some reactive aggregate particles to reduce adhesion between the ice and the at least a portion of the road bed surface. Further, the method includes removing the ice from the road bed surface 606.

A road bed formed from a plurality of magnetite concentrate particles, a plurality of reactive aggregate particles, and an acidic activator including phosphate anions, and which may or may not further include an elastomeric coating, can absorb various forms of radiation energy (e.g., non-ionizing radiation energy), such as from microwave radiation, directed to the road bed. In one or more embodiments, non-ionizing radiation may include one or more of, for example, near ultraviolet, visible light, infrared, microwave, radio waves, low frequency RF, and static fields. In one or more embodiments, the top course of roadway construction or a new road may be made of the material including a plurality of magnetite concentrate particles, a plurality of reactive aggregate particles, and an acidic activator including phosphate anions, and optionally an elastomeric coating. In particular, the magnetite (e.g., from reactive aggregate particles, from magnetite concentrate particles, etc.) in the road bed enhances the road bed response to external heating and excitation by infrared, microwave, or induction heat treatments and may produce localized eddy current heating (e.g., by electrical induction generators). The ability to hold significant energy or to be induced to produce local eddy current resistance heating may allow non-chemical deicing to occur for one or more embodiments of the present disclosure, which employ magnetite constituents. In at least one embodiment, the road bed includes enough magnetic iron oxide material so that energy absorption via inductive coupling or radiation heating could take place to bring the surface of the pavement to a temperature to induce localized melting of the attached ice layer. Ice may not absorb significant energy from microwave treatments or become involved in inductive coupling and consequent eddy current heating, so radiation may be directed through the ice to the road bed surface to effect heating of at least some reactive aggregate particles.

Application of such energy to the road bed surface can raise the temperature of the road bed surface. When such a road bed surface has ice on at least a portion thereof, such energy may be applied to the road surface in an amount effective to reduce adhesion between the ice and the at least a portion of the road bed surface. In some embodiments, some ice at the surface of the road bed surface may melt. Upon the application of such energy to the road bed surface, the ice may be removed by known methods, as with a conventional scraping device, such as a blade on a snow plow, for instance. One or more processes to provide microwave energy, as described in, for example, Hopstock et al., "Minnesota Taconite as a Microwave-Absorbing Road Aggregate Material for Deicing and Pothole Patching Applications," Minnesota Department of Transportation, St. Paul, Minn. (2004) (NRRI Technical Report NRRI/TR-2004/19) incorporated herein by reference, may be used.

Methods for deicing according to the present disclosure may allow non-chemical deicing to occur. Truck-mounted energy imparting devices may be used to transfer the energy to the road bed surface. Applications for methods for deicing according to the present disclosure include, but are not limited to, ice removal from pavement areas where safety and the avoidance of corrosion is a significant factor: bridge decks, highway off-ramps, hilly terrains, etc. Additional applications, in certain embodiments, may be environmentally sensitive areas and airport runways where chemical deicing may be problematic for airplane corrosion.

Figure 7:
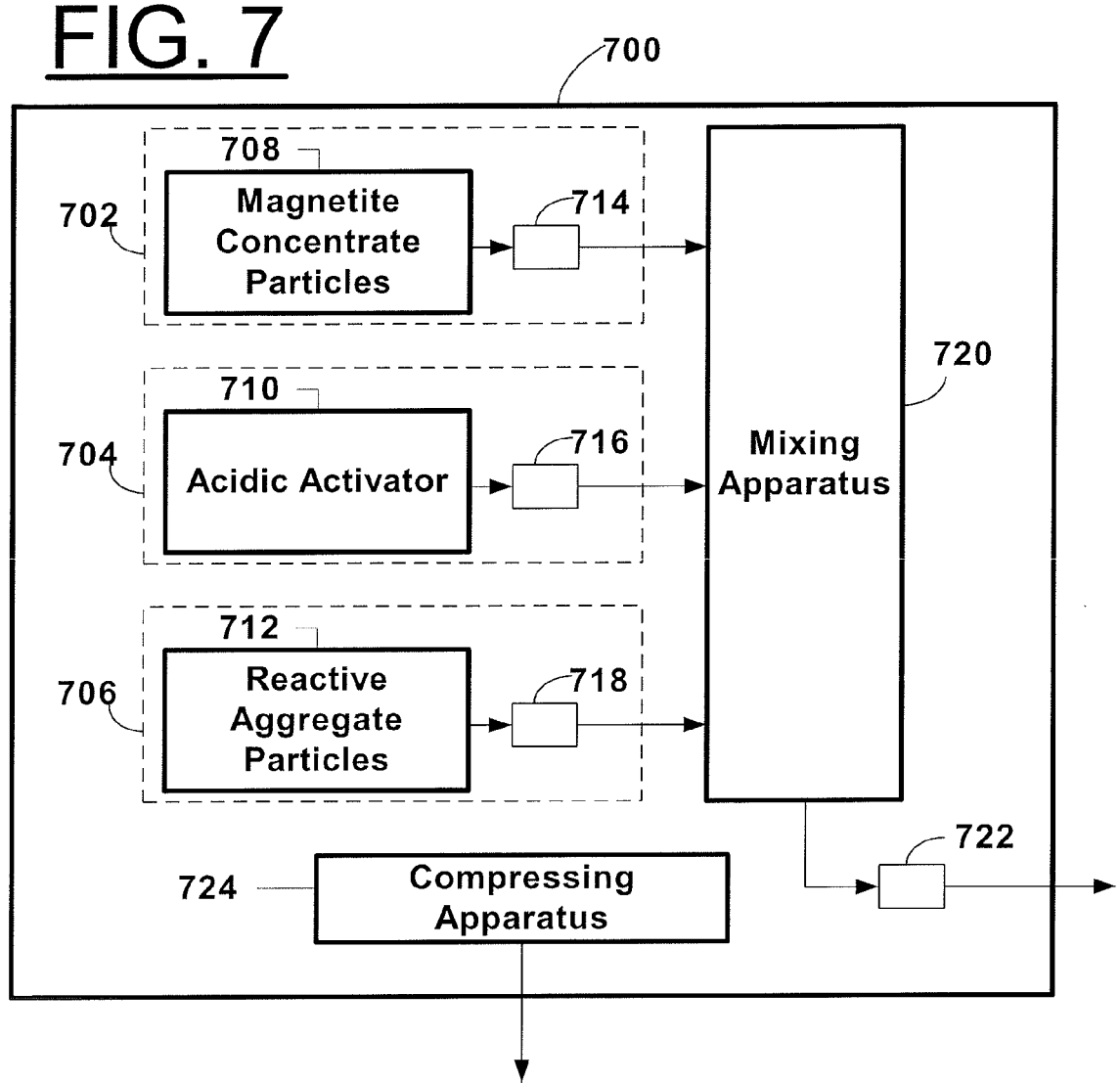
FIG. 7 is a block diagram representing a system for applying a patching material according to the present disclosure.

Referring to FIG. 7, another aspect of the present invention is a system 700 for applying a patching material. Such a system 700 for applying a patching material includes a mixing apparatus 720 and at least one controllable outlet 722 to discharge contents from the mixing apparatus 720. The system 700 also includes at least one controllable source 702 for providing a plurality of magnetite concentrate particles 708 to the mixing apparatus 720. It should be noted that the descriptions of all of the one or more components of the system 100 of FIG. 1A or system 108 of FIG. 1B may also apply to the system 700 of FIG. 7. For example, all ranges of compositions and particle sizes and/or other characteristics in the system 100 of FIG. 1A or system 108 of FIG. 1B may be used in the system 700 of FIG. 7. For example, the plurality of magnetite concentrate particles 708 may have a size of −200 mesh and may have a reactive iron concentration greater than 55 percent by weight. The system 700 includes at least one controllable source 706 for providing a plurality of reactive aggregate particles 712 that includes iron to the mixing apparatus 720. Such a plurality of reactive aggregate particles 712 may have a reactive iron concentration in a range of 3 percent to 47 percent by weight. The size of the plurality of reactive aggregate particles 712 may be in a range of +100 mesh to −1 inch mesh. The system 700 includes at least one controllable source 704 for providing at least one acidic activator 710 that includes phosphate anions to the mixing apparatus 720. In one or more embodiments, the at least one controllable source 704 for providing the at least one acidic activator 710 provides the at least one acidic activator 710 to the mixing apparatus 720 after the other components (e.g., the magnetite concentrate particles 708 and reactive aggregate particles 712) have been mixed. The at least one controllable outlet 722 discharges from the mixing apparatus 720 a mixture formed from the plurality of magnetite concentrate particles 708, the plurality of reactive aggregate particles 712, and the at least one acidic activator 710 including phosphate anions. The system may also include a compressing apparatus 724 to compress the discharged mixture.

Such a system 700 for applying a patching material may be a mobile system that can apply a patching material to various repair sites or construction sites. Such a mobile system may include one or more vehicles. The mixing apparatus 720 may be any known mixing apparatus capable of intimately mixing the plurality of magnetite concentrate particles 708, plurality of reactive aggregate particles 712, at least one acidic activator 710, and optionally a plurality of filler particles. In at least one embodiment, the mixing apparatus 720 is a pin mixer.

In the present disclosure, many factors affect the reaction speed and setting time of mixtures that include the at least one acidic activator with the magnetite concentrate particles and/or the reactive aggregate particles. Such factors include, but are not limited to, the temperature of the mixture, the concentration (e.g., the pH) of the acidic activator, the amount of phosphate salts, if any, added to the acidic activator, and the relative concentrations of the at least one acidic activator, magnetite concentrate particles, and reactive aggregate particles. Accordingly, these factors may be varied to allow an appropriate time in which the mixture is workable prior to application on a repair site where the mixture may cure.

Accordingly, the system 700 for applying a patching material includes at least one controllable source 702, 704, 706 for providing to the mixing apparatus at least each of the following: a plurality of magnetite concentrate particles 708, a plurality of reactive aggregate particles 712, and at least one acidic activator 710 that includes phosphate anions. Utilizing a magnetite concentrate particle controller 714, an acidic activator controller 716, and a reactive aggregate particle controller 718 for the separate controllable sources 702, 704, 706 allow varying the amount of each component provided to the mixing apparatus 720, thereby controlling the relative concentrations of the components in order to vary the reaction rate and setting time for the mixture. In one or more embodiments of the present invention, the concentration of the acidic activator (e.g., phosphate binder) can be used to modify the curing time of the material to allow for application in both hot and cold weather conditions.

A system 700 for applying a patching material according to the present disclosure may operate in various ambient conditions. In various ambient conditions, one may wish to vary the reaction rate and thus vary the setting time for the patching material. In batch mixing, for example, controlling the amount of each component provided to the mixing apparatus allows control of the relative concentration of each component in the mixing apparatus. Controlling the relative concentrations (e.g., composition of the aggregate blend) and/or rates of addition to the mixing apparatus allows variance in the reaction rate and setting time for the patching material. In some embodiments, the relative concentrations and/or rates allowed by the controllable sources may be determined by manual settings. In one or more embodiments, the relative concentrations and/or rates allowed by each of the controllable sources may be determined using predetermined values based on ambient conditions (e.g., temperature, humidity, etc.) or other criteria.

The system 700 for applying a patching material includes a controllable outlet 722 to discharge from the mixing apparatus 720 a mixture formed from the plurality of magnetite concentrate particles 708, the plurality of reactive aggregate particles 712, and the at least one acidic activator 710. Although any known controllable outlet 722 may be used, such a controllable outlet 722 may, in some embodiments, be in the form of a gravity discharge using a hose, chute or trough or may, in other embodiments, be in the form of an auger or a screw discharge apparatus.

In one or more embodiments, a multiple bin system may be fed into a pin mixer via, for example, weigh belts to add the correct proportions of optional filler particles (e.g., aggregate), reactive aggregate particles (e.g., iron-bearing aggregate), and magnetite concentrate particles and to thoroughly mix the materials for preparation of the maintenance repair mixture (e.g., patching material). Another container may contain an acidic activator, such as a dilute aqueous solution of, for example, orthophosphoric acid and dissolved phosphate salt. The liquid mix may be ratably added to the pin mixer at the correct proportion in the later stages of the mixing process in order to assure significant workability of the mixture prior to and/or during discharge into a repair site via, for example, a screw discharge into a conveying hose or chute which would allow easy placement of the mixture.

The system 700 for applying a patching material may include a compressing apparatus 724 to compress the discharged mixture. Although any known compressing apparatus 724 may be used, such a compressing apparatus 724 may, in some embodiments, be in the form of a roller or may, in other embodiments, be in the form of a stamping and/or tamping apparatus.

Table 2 displays averages of composite screen analysis of coarse taconite tailings collected from five operations in 2001-2002. The operations included in Table 2 correspond with the United Taconite Mines (UTAC) near Eveleth, Minn., the Hibbing Taconite Company (HIBTAC) near Hibbing, Minn., the US Steel Minnesota Ore Operations—Minntac Plant (MINNTAC) near Mountain Iron, Minn., the Arcelor-Mittal Steel USA Minorca Mine (MITTAL) near Virginia, Minn., and the US Steel Minnesota Ore Operations—Keewatin Taconite (KEETAC) near Keewatin, Minn. The Minntac operation (center column) may be a likely source for the tailings (e.g., coarse tailings) that may be used in one or more embodiments of the present disclosure (e.g., examples herein and one or more embodiments described in reference to FIGS. 1A, 1B, 2A, 2B, 3, 4, 5A, 5B, 6, and 7).

TABLE 2

Exemplary average size distributions for coarse tailings from five iron ore operations.

| Sieve Size | Sieve Opening (mm) | Percent retained: all operations | | | | |
|---|---|---|---|---|---|---|
| | | UTAC | HIBBTAC | MINNTAC | MITTAL | KEETAC |
| 3/8 inch | 9.5 | 0.0 | 0.3 | 0.0 | 0.0 | 0.0 |
| NO. 4 | 4.75 | 3.9 | 8.3 | 1.8 | 0.7 | 1.7 |
| NO. 6 | 3.35 | 12.7 | 13.0 | 6.2 | 3.0 | 7.7 |
| NO. 8 | 2.36 | 24.0 | 19.1 | 14.5 | 6.6 | 19.1 |
| NO. 10 | 2 | 30.9 | 22.1 | 21.4 | 11.0 | 25.8 |
| NO. 12 | 1.7 | 32.7 | 20.2 | 22.8 | 13.0 | 25.0 |
| NO. 16 | 1.18 | 49.4 | 28.1 | 42.3 | 27.4 | 39.6 |
| NO. 20 | 0.85 | 62.5 | 32.9 | 58.5 | 43.8 | 46.5 |
| NO. 30 | 0.6 | 71.7 | 41.5 | 71.1 | 56.3 | 57.5 |
| NO. 40 | 0.425 | 79.4 | 50.7 | 81.9 | 69.0 | 64.2 |
| NO. 50 | 0.3 | 86.2 | 63.2 | 90.1 | 79.8 | 71.8 |
| NO. 70 | 0.212 | 91.6 | 74.0 | 94.8 | 88.4 | 75.6 |
| NO. 80 | 0.18 | 93.0 | 80.0 | 96.3 | 91.0 | 77.5 |
| NO. 100 | 0.15 | 95.1 | 84.3 | 96.7 | 93.4 | 81.6 |
| NO. 140 | 0.106 | 97.7 | 90.6 | 98.4 | 97.0 | 85.2 |
| NO. 200 | 0.075 | 98.0 | 94.4 | 98.4 | 97.4 | 88.0 |
| NO. 270 | 0.053 | 99.0 | 96.8 | 99.2 | 98.5 | 90.7 |

(Percent retained increases with smaller sieve openings. Values that decrease indicate experimental variance.)

TABLE 3A

Compositional analysis (provided in weight percents) of coarse tailings from the United Taconite Mines (UTAC) near Eveleth, MN.

| Property | UTAC | UTAC | UTAC | UTAC |
|---|---|---|---|---|
| $Fe_2O_3$ % | 26.31 | 27.74 | 28.17 | 21.87 |
| $SiO_2$ % | 63.07 | 63.68 | 58.27 | 64.95 |
| $Al_2O_3$ % | 0.25 | 0.34 | 0.50 | 0.33 |
| CaO % | 1.25 | 1.06 | 0.97 | 1.66 |
| MgO % | 2.63 | 2.69 | 3.28 | 3.44 |
| MnO % | 0.517 | 0.455 | 0.797 | 0.553 |

TABLE 3A-continued

Compositional analysis (provided in weight percents) of coarse tailings from the United Taconite Mines (UTAC) near Eveleth, MN.

| Property | UTAC | UTAC | UTAC | UTAC |
|---|---|---|---|---|
| $CO_2$ % | 5.22 | 3.19 | 7.70 | 6.42 |
| $Na_2O$ % | 0.017 | 0.017 | 0.059 | 0.080 |
| $K_2O$ % | 0.072 | 0.063 | 0.125 | 0.114 |
| Comb. $H_2O$ % | 1.65 | 1.42 | 1.70 | 1.55 |
| $TiO_2$ % | 0.02 | 0.026 | 0.039 | 0.011 |
| $P_2O_5$ % | 0.044 | 0.041 | 0.060 | 0.034 |
| Total Oxides % | 101.05 | 100.72 | 101.66 | 101.02 |
| Total Fe % | 18.4 | 19.4 | 19.7 | 15.3 |
| Satmagan MagFe % | 2.92 | 5.23 | 1.92 | 1.86 |
| Fe++ % | 7.46 | 5.15 | 11.86 | 7.27 |
| S % | 0.041 | 0.036 | 0.064 | 0.038 |

TABLE 3B

Compositional analysis (provided in weight percents) of coarse tailings from the Hibbing Taconite Company (HIBBTAC) near Hibbing, MN.

| Property | HIBBTAC | HIBBTAC | HIBBTAC | HIBBTAC |
|---|---|---|---|---|
| $Fe_2O_3$ % | 23.59 | 25.02 | 20.87 | 24.73 |
| $SiO_2$ % | 63.53 | 61.79 | 65.70 | 63.82 |
| $Al_2O_3$ % | 0.37 | 0.36 | 0.30 | 0.22 |
| CaO % | 1.55 | 1.60 | 1.63 | 1.65 |

TABLE 3B-continued

Compositional analysis (provided in weight percents) of coarse tailings from the Hibbing Taconite Company (HIBBTAC) near Hibbing, MN.

| Property | HIBBTAC | HIBBTAC | HIBBTAC | HIBBTAC |
|---|---|---|---|---|
| MgO % | 3.22 | 2.78 | 3.31 | 2.63 |
| MnO % | 0.637 | 0.710 | 0.596 | 0.634 |
| $CO_2$ % | 6.57 | 7.10 | 6.96 | 5.60 |
| $Na_2O$ % | 0.018 | 0.011 | 0.053 | 0.052 |
| $K_2O$ % | 0.082 | 0.073 | 0.093 | 0.044 |

TABLE 3B-continued

Compositional analysis (provided in weight percents)
of coarse tailings from the Hibbing Taconite
Company (HIBBTAC) near Hibbing, MN.

| Property | HIBBTAC | HIBBTAC | HIBBTAC | HIBBTAC |
|---|---|---|---|---|
| Comb. $H_2O$ % | 1.57 | 1.68 | 1.65 | 1.60 |
| $TiO_2$ % | 0.011 | 0.009 | 0.010 | 0.019 |
| $P_2O_5$ % | 0.044 | 0.044 | 0.039 | 0.030 |
| Total Oxides % | 101.19 | 101.18 | 101.22 | 101.03 |
| Total Fe % | 16.5 | 17.5 | 14.6 | 17.3 |
| Satmagan MagFe % | 1.79 | 1.54 | 1.29 | 2.84 |
| Fe++ % | 8.41 | 8.28 | 8.59 | 7.49 |
| S % | 0.033 | 0.025 | 0.029 | 0.048 |

TABLE 3C

Compositional analysis (provided in weight percents) of
coarse tailings from the US Steel Minnesota Ore Operations -
Minntac Plant (MINNTAC) near Mountain Iron, MN.

| Property | MINNTAC | MINNTAC | MINNTAC | MINNTAC |
|---|---|---|---|---|
| $Fe_2O_3$ % | 23.45 | 22.59 | 26.02 | 29.02 |
| $SiO_2$ % | 66.15 | 65.46 | 65.20 | 61.62 |
| $Al_2O_3$ % | 0.45 | 0.90 | 0.33 | 0.39 |
| CaO % | 1.12 | 1.45 | 0.87 | 1.61 |
| MgO % | 2.68 | 2.77 | 2.26 | 1.96 |
| MnO % | 0.533 | 0.689 | 0.617 | 0.773 |
| $CO_2$ % | 4.37 | 5.24 | 3.83 | 3.54 |
| $Na_2O$ % | 0.025 | 0.031 | 0.013 | 0.019 |
| $K_2O$ % | 0.103 | 0.126 | 0.069 | 0.110 |
| Comb. $H_2O$ % | 1.89 | 1.69 | 1.42 | 1.42 |
| $TiO_2$ % | 0.033 | 0.070 | 0.020 | 0.025 |
| $P_2O_5$ % | 0.041 | 0.060 | 0.037 | 0.046 |
| Total Oxides % | 100.84 | 101.07 | 100.68 | 100.53 |
| Total Fe % | 16.4 | 15.8 | 18.2 | 20.3 |
| Satmagan MagFe % | 2.63 | 2.72 | 2.52 | 2.94 |
| Fe++ % | 7.52 | 8.67 | 5.73 | 4.77 |
| S % | 0.253 | 0.194 | 0.152 | 0.170 |

TABLE 3D

Compositional analysis (provided in weight percents)
of coarse tailings from the ArcelorMittal Steel USA
Minorca Mine (MITTAL) near Virginia, MN.

| Property | MITTAL | MITTAL | MITTAL | MITTAL |
|---|---|---|---|---|
| $Fe_2O_3$ % | 23.88 | 19.02 | 19.30 | 24.31 |
| $SiO_2$ % | 67.28 | 70.72 | 71.95 | 65.53 |
| $Al_2O_3$ % | 0.29 | 0.27 | 0.12 | 0.20 |
| CaO % | 1.62 | 1.11 | 0.97 | 1.33 |
| MgO % | 2.04 | 3.27 | 1.67 | 2.57 |
| MnO % | 0.662 | 0.646 | 0.787 | 0.733 |
| $CO_2$ % | 3.45 | 4.04 | 4.52 | 4.77 |
| $Na_2O$ % | 0.041 | 0.022 | 0.052 | 0.043 |
| $K_2O$ % | 0.078 | 0.081 | 0.042 | 0.036 |
| Comb. $H_2O$ % | 1.23 | 1.48 | 1.67 | 1.68 |
| $TiO_2$ % | 0.022 | 0.013 | 0.007 | 0.016 |
| $P2O_5$ % | 0.037 | 0.030 | 0.025 | 0.032 |
| Total Oxides % | 100.62 | 100.70 | 101.12 | 101.24 |
| Total Fe % | 16.7 | 13.3 | 13.5 | 17.0 |
| Satmagan MagFe % | 2.55 | 1.80 | 3.02 | 2.35 |
| Fe++ % | 4.40 | 4.95 | 7.94 | 8.89 |
| S % | 0.021 | 0.022 | 0.026 | 0.042 |

TABLE 3E

Compositional analysis (provided in weight percents) of
coarse tailings from the US Steel Minnesota Ore Operations -
Keewatin Taconite (KEETAC) near Keewatin, MN.

| Property | KEETAC | KEETAC |
|---|---|---|
| $Fe_2O_3$ % | 27.74 | 29.45 |
| $SiO_2$ % | 61.71 | 59.11 |
| $Al_2O_3$ % | 0.30 | 0.32 |
| CaO % | 1.29 | 1.59 |
| MgO % | 3.08 | 3.31 |
| MnO % | 0.656 | 0.660 |
| $CO_2$ % | 4.51 | 4.49 |
| $Na_2O$ % | 0.012 | 0.014 |
| $K_2O$ % | 0.081 | 0.074 |
| Comb. $H_2O$ % | 1.40 | 1.67 |
| $TiO_2$ % | 0.016 | 0.015 |
| $P_2O_5$ % | 0.032 | 0.032 |
| Total Oxides % | 100.83 | 100.74 |
| Total Fe % | 19.4 | 20.6 |
| Satmagan MagFe % | 3.10 | 2.57 |
| Fe++ % | 5.90 | 5.36 |
| S % | 0.030 | 0.041 |

Tables 3A-3E display the results of compositional testing of samples of coarse tailings from five ore processing operations. The results indicate unnormalized percentages of the listed oxides for each sample (each value for "Total Oxides %" does not equal 100 percent due to experimental variance). The values for "$Fe_2O_3$%" are calculated based on the Total Fe %, assuming all iron is present as $Fe_2O_3$ (i.e., total iron reported as $Fe_2O_3$). The values for "Satmagan MagFe %" are the magnetite concentrations as reported by testing from a Satmagan apparatus, which measures the magnetic material content of the sample. It should be noted that values for both the "Fe++" and "Satmagan MagFe %" represent portions of the "Total Fe" value for each sample. The "S %" values indicate the sulfur content in each sample and were determined by different testing methods than the oxides content. Coarse tailings having the compositions shown in Tables 3A-3E may be used in one or more embodiments of the present disclosure (e.g., filler particles, coating filler particles, etc.). In Tables 3A-3E, the silica content of coarse tailings ranges from about 58 percent to about 72 percent, and in Table 1, the silica content of rod mill feed ranges from about 39 percent to about 50 percent. A silica-bearing phase (e.g., a complex iron phosphate silica phase) may be present near a boundary between a phosphate binding cement phase and an aggregate phase (e.g., reactive aggregate particles or filler particles) in a patching material according to one or more embodiments of the present disclosure. While not wishing to be bound by theory, it is possible that the silica content that may be present in reactive aggregate particles and/or filler particles may contribute to the strength of the patching materials containing such reactive aggregate particles and/or filler particles. In other words, the presence of silica may participate in the bonding of the acidic activator (having phosphate anions) and the reactive aggregate particles and magnetite concentrate particles.

The following examples are offered to further illustrate various specific embodiments and techniques of the present invention. It should be understood, however, that many variations and modifications understood by those of ordinary skill in the art may be made while remaining within the scope of the present invention. Therefore, the scope of the invention is not intended to be limited by the following examples.

Example 1

Magnetite ($Fe_3O_4$) concentrate, −20 mesh tailings, coarse tailings, −½ inch taconite ore, orthophosphoric acid solution (in a concentration of 85 percent), water, and monocalcium phosphate (in the form of triple superphosphate fertilizer pellets) were provided.

All percentage concentrations are given by weight.

The reactive iron concentration of the −½ inch taconite ore was about 19 percent by weight. The reactive iron concentration of the tailings used was about 3 percent.

To make 1 kg of activator, 100 g triple superphosphate (e.g., triple superphosphate fertilizer pellets) was mixed into 371 g water, and 529 g orthophosphoric acid (85 percent) was added.

Large quantities of activator can be made in advance and used as needed. The activator composition was 45 percent orthophosphoric acid ($H_3PO_4$), 45 percent water, and 10 percent monocalcium phosphate (triple superphosphate fertilizer pellets). The triple superphosphate fertilizer pellets were crushed in a mortar and combined with the quantity of water. At this point, a significant amount of the triple superphosphate fertilizer pellets remained undissolved in the solution. The orthophosphoric acid was slowly added into the monocalcium phosphate solution and stirred. The activator was allowed to sit, which allowed time for the triple superphosphate to fully dissolve.

To make 10 kg of repair material, 1.5 kg of magnetite concentrate, 2.5 kg of −20 mesh tailings, 2.5 kg of coarse tailings, 1 kg of activator, and 2.5 kg of −½ inch taconite ore were used.

The magnetite concentrate, −20 mesh tailings, and coarse tailings in plastic container were combined and mixed well. The −½ inch taconite ore (i.e., reactive aggregate particles) were measured out and set aside, but were not added to the mixture. The acidic activator was poured into the above mixture and worked quickly to fully combine the mixture. After mixing for at least five minutes, the −½ inch ore was added and mixed until well incorporated.

A plastic cylinder was prepared by spraying the inside with a Teflon-based mold release. Between 15 and 25 minutes after the activator contacted the cement powder (i.e., magnetite concentrate), it was poured into the mold. The mixture was worked rapidly, but while pouring, breaks were taken to tap the cylinder to release air bubbles. Once filled, the concrete was pressed into the mold with gloved hands. The concrete set in an additional 10-30 minutes. The concrete was allowed to further harden in the mold for several days.

Example 2A

Magnetite ($Fe_3O_4$) concentrate, coarse tailings, orthophosphoric acid solution (in a concentration of 85 percent), water, and monocalcium phosphate (in the form of triple superphosphate fertilizer pellets) were provided.

To make 4 kg of activator, 400 g triple superphosphate (e.g., triple superphosphate fertilizer pellets) was mixed into 1,484 g water, and 2,116 g orthophosphoric acid (85 percent) was added.

The activator composition was 45 percent orthophosphoric acid ($H_3PO_4$), 45 percent water, and 10 percent monocalcium phosphate (triple superphosphate fertilizer pellets). The triple superphosphate fertilizer pellets were crushed in a mortar and combined with the quantity of water. At this point, a significant amount of the triple superphosphate fertilizer pellets remained undissolved in the solution. The orthophosphoric acid was slowly added into the monocalcium phosphate solution and stirred. The activator was allowed to sit for about two hours, which allowed time for the triple superphosphate to dissolve as much as possible. Residue in the pellets gave the solution an opaque brown tint and left a small accumulation of material that did not dissolve.

To make 20 kg of dry mix, 10 kg of magnetite concentrate and 10 kg of coarse tailings were used. The coarse tailings included a reactive iron concentration of about 3.28 percent by weight. The size of the coarse tailings was in a range of about −4 mesh to about +50 mesh. The magnetite concentrate particles used had a size of about −200 mesh and had a reactive iron concentration of about 67 percent by weight.

To prepare a cylinder, 550 g of dry mix was combined with 110 g of activator solution and mixed for 3 minutes and 30 seconds. The mixture was then used to fill a 2" (5.08 cm) diameter and 4" (10.16 cm) high plastic cylinder mold to the top. The mold was pounded on a tabletop to settle the material while filling the cylinder. The mold was covered with a glass plate coated in silicone grease and placed in a vice, which was clamped lightly to avoid bowing of the mold due to pressure. Excess material was wiped away and allowed to sit for 15 minutes. The finished cylinder had a mass of about 510 g (not all of the mixture fit in the mold).

Preparing 3U18 Portland cement concrete: Minnesota Department of Transportation grade 3U18 Portland cement concrete patching mix was used as an example of a typical concrete patch compound, principally to compare its compressive strength with that of taconite cement concrete. In this study, a water/cement ratio of 0.35 was used to calculate the amount of water, and no admixtures were used.

Making the Portland cement concrete test cylinder: To make a pair of Mn/DOT 3U18 concrete test cylinders (2 in. diameter by 4 in. tall), 79 g of water was added to 950 g of 3U18 mix. The mixture was mixed thoroughly for 4 to 5 minutes. The material was added to the cylinders in many stages, tamping each stage firmly with a screwdriver handle or other suitable tool. The cylinders were filled such that a final tamp and troweling left the surface flush with the edge of the mold. The cylinders were allowed to sit until the top surface was dry (a few hours), and then the molds were covered in clingwrap to retain moisture during curing. The cylinders were allowed to cure in the molds until compression testing.

Test cylinders underwent compressive strength testing in an Instron brand press using 60 durometer compression pads held in machined caps, with a compression speed of 0.2 inches (0.51 cm) per minute. A durometer is a measure of hardness typically applied to rubber material. The 60 durometer caps are recommended for anticipated strengths of 2,500 to 7,000 psi (17 to 48 MPa).

Samples were tested to failure; the maximum force was recorded using a load cell on the compression apparatus. The total load force was divided by that sample area to determine pressure where failure occurred.

To quantify the effect of mixing time on the compressive strength of the cylinders made from the dry mix containing magnetite concentrate and coarse tailings, three sets of four test cylinders were made, with the mixing time as the independent variable. The sets were mixed for 1 min. 30 sec., 2 min. 30 sec., and 3 min. 30 sec. Before 1 min., the cement had not been fully mixed, and beyond 4 min., the cement had begun to set, making consistent tests outside this range difficult because partially set concrete did not produce a cylinder of adequate quality.

To compare the relative compressive strengths of taconite cement and Portland cement concretes, test cylinders cured for 1, 3, and 7 days were cast for both the taconite cement concrete (dry mix included only magnetite concentrate and coarse tailings) and the 3U18 patch mix. These time intervals were tailored to Portland cement concrete's curing times. In addition, a 28-day compressive strength test was done on test cylinders of the 3U18 mix to compare to previously published results. Twenty-eight days is the standard curing time when compression testing Portland cement concrete.

To measure the development of compressive strength during the curing of taconite cement concrete, test cylinders were prepared and tested on a timescale relevant to the chemistry of the taconite cement, rather than the Portland cement as above. Cylinders were tested every 15 minutes up to one hour of curing, and then every hour up to six hours.

To compare the compressive strengths of taconite cement concretes made with aggregate containing different amounts of magnetite, test cylinders (as described hereinabove made from only acidic solution, magnetite concentrate, and taconite tailings) were tested and compared with: cylinders made with an equal weight of sand/pea gravel mixture (low magnetite; about 0.73 weight percent magnetic iron) in a proportion (56% sand, 44% pea gravel) such that the mean particle size was the same as the mean particle size of the coarse tailings; cylinders made with ore for aggregate (highest magnetite concentration; about 7.86 weight percent magnetic iron content) instead of coarse tailings (about 3.28 weight percent magnetic iron content); and a 50/50 by weight mixture of ore and tailings, which would have an intermediate magnetite concentration; more than tailings alone, but less than ore alone).

The ore aggregate included a reactive iron concentration of about 7.86 percent by weight. The size of the ore aggregate particles was about +40 mesh to about −½ inch mesh.

To calculate the porosity of the samples, it was necessary to know the particle density of the control mix, i.e., its density without any voids. Pulverized samples of the cured taconite cement (without aggregate) and cured cement/aggregate mixture were weighed to determine their mass and then displaced in water to determine volume. These data were used to calculate their particle density. The porosity $\phi$ of a bulk material is dependent on its bulk density $\rho_{bulk}$ (the density of the bulk solid with voids) and its particle density $\rho_{particle}$ in the following manner:

$$\phi = 1 - (\rho_{bulk}/\rho_{particle}).$$

Bulk densities were determined by dividing the mass of each cylinder by the volume of the cylinder mold (12.6 in$^3$ or 206.5 cc). Table 4 lists particle densities of taconite cement matrix and the taconite cement concrete with aggregate.

TABLE 4

Particle densities of the taconite cement matrix and the taconite cement concrete with aggregate.

| Material | Particle density (g/cc) |
| --- | --- |
| Cement | 2.98 |
| Cement/aggregate | 2.94 |

Mixing time was found to have an effect on the compressive strength of the cylinders. The averages of compressive strength results for each mixing time increased from about 1,400 psi for a mixing time of 1 minute and 30 seconds to about 2,200 psi for a mixing time of 2 minutes and 30 seconds to about 3,100 psi for a mixing time of 3 minutes and 30 seconds.

Mixing time was found to be closely correlated to the porosity of the resulting cylinder. The porosity of the cylinders tested ranged from 0.31 to 0.15. The longest mixing time resulted in half the porosity of the shortest mixing time and roughly doubled the compressive strength. In this example, a mix time of 3 min. 30 sec. provided consistently high compressive strength. The porosity data also reflect the reproducibility of the procedure: the 3 min. 30 sec. samples, in addition to having the highest compressive strength, have very similar porosities.

Comparison of Portland cement and taconite cement concretes: The cylinders having a dry mix that contained only magnetite concentrate and coarse tailings reached a maximum compressive strength of 3,080 psi after one day, then lost approximately 600 psi between the third and seventh day, to a final strength of 2,392 psi. At one day after mixing, these cylinders had a comparable compressive strength to Portland cement concrete compound 3U18 mix.

Development of compressive strength during curing of taconite cement concrete: The cylinders having a dry mix containing only magnetite concentrate and coarse tailings cured to 80% strength in the first hour, and reached maximum strength in approximately four hours. This short timeframe is advantageous—common Portland cement concretes require extended curing times, often with use of curing compounds or wet curing techniques, which are an additional expense on top of the inconvenience of lane closure on roads. It should also be noted that the cylinders having a dry mix containing only magnetite concentrate and coarse tailings set in 10 minutes, which when coupled with the early development of strength could mean that in practice a road crew using this patch compound may not need to leave lanes closed behind them.

Effect of aggregate composition on strength of taconite cement concrete: As described above, for all cylinders, the formula was the same except for the composition of the aggregate. In each cylinder under comparison, the aggregate was (1) 100 percent coarse tailings, (2) a 50/50 mixture of coarse tailings and ore (rod mill feed), (3) 100 percent ore (i.e., rod mill feed), or (4) a sand/pea gravel mixture.

The cylinder made with the sand/pea gravel mixture had the lowest compressive strength, about 1826 psi±about 42 psi (about 12.6 MPa±about 0.3 MPa). The compressive strength of the cylinder having an aggregate that included 100 percent ore aggregate was about 2100 psi±about 271 psi (about 14.5 MPa±about 1.9 MPa). The compressive strength of the cylinder having a aggregate that included 50 percent by weight coarse tailings and 50 percent by weight ore aggregate was about 2221 psi±about 199 psi (about 15.3 MPa±about 1.4 MPa). The compressive strength of the cylinder having an aggregate that included 100 percent coarse tailings was 3081 psi±about 71 psi (about 21.2 MPa±about 0.5 MPa). The plus/minus values represent the standard deviation for all tests in each composition.

Example 2B

Three additional cylinders were made according to the procedure of Example 2A for cylinders having aggregate that included 100 percent ore aggregate, except that the particle size distribution of the ore aggregate was changed to approximate the particle size distribution of the coarse tailings aggregate used in the cylinders described in Example 2A.

A sample of taconite ore was crushed and sieved to produce three fractions of different grain sizes. These fractions were mixed in proportion to approximate the size gradation of the coarse tailings used in Example 2A.

The average compressive strength of the three cylinders having an aggregate that included 100 percent ore aggregate wherein the particle size distribution of the ore aggregate approximated the particle size distribution of the coarse tailings used in Example 2A was about 4728 psi±about 288 psi (about 32.6 MPa±about 2.0 MPa). The plus/minus value represents the standard deviation for the tests having this composition.

Example 3

A cylinder in which the aggregate was 100 percent coarse tailings and a cylinder in which the aggregate was a 50/50 mixture of coarse tailing and ore, each from Example 2A after compression testing, were examined by scanning electron microscopy and energy dispersive spectroscopy.

Select pieces of the two cement-aggregate compositions were mounted in epoxy, polished into 1¼ inch diameter sections and examined in a scanning electron microscope (JEOL JSM-6490LV) using backscattered electron (BSE) imaging and energy dispersive spectroscopy (EDS).

EDS detects the characteristic X-rays produced by interactions with an incident electron beam. The energy intensity of these X-rays is used to measure the chemical composition of the material where the beam is focused. Prior to analysis, samples were coated with gold (to make them conductive); therefore, gold is ubiquitous in the results and ignored. Additional elements not reported include: carbon (epoxy), aluminum (presumably from remnant polish), and oxygen (ubiquitous). All results are reported in atomic percent.

Semi-quantitative EDS analysis of the two materials tested showed similar results. The bulk of the cement in both compositions included an iron phosphate with a P/Fe ratio of about 1.1±0.5. Some results indicated the presence of calcium and/or sodium. Both compositions contained an additional compound that contained both phosphorus and silicon located near the ore-cement and tailings-cement boundary. These analyses detected a silica+phosphorus phase isolated between two chemically distinct spectrums, neither of which contained phosphorus. Although not wishing to be bound by theory, it is believed that these results suggest that the phosphorus migrated by some mechanism across the cement-aggregate interface.

TABLE 5

EDS results from the magnetite + ore composition

| Spectrum | Fe | Mg | Mn | Ca | P | K | Si | P/(Ca + K) | P/Fe |
|---|---|---|---|---|---|---|---|---|---|
| 1 | 13.57 | 2.69 | 0.85 | | | | | | |
| 2 | 0.97 | | | | | | 30.52 | | |
| 3 | | 0.72 | | | 4.56 | | 6.26 | | |
| 4 | 73.13 | 7.27 | | 7.69 | | | 65.09 | | |
| 5 | 8.60 | | | 1.33 | 9.26 | | | 7.0 | 1.1 |
| 6 | 26.46 | | | 6.09 | 33.74 | 1.99 | | 4.2 | 1.3 |
| 7 | 28.50 | | | 6.31 | 37.29 | 2.19 | | 4.2 | 1.3 |

Seven EDS spectrums were collected along a line that crosses an ore-cement boundary. Three analyses are of the ore (Spectrums 1, 2, and 4) and four are of the cement and contain phosphorus (Spectrums 3, 5, 6, and 7). Spectrum 3 is unique because it has a silica-rich phase, but also contains phosphorus. It is distinctly different from surrounding Spectrums 2 and 4, which are ore and do not contain phosphorus. Spectrum 5 is also chemically unique when compared with cement Spectrums 6 and 7; it has a much higher P/(Ca+K) ratio (7.0 verses 4.2). A visible crack along the analyzed area was only seen within the cement (between Spectrums 6 and 7) and not at the ore-cement boundary.

TABLE 6

EDS results from the magnetite + ore + tailings

| Spectrum | Fe | Mg | Ca | P | K | Si | P/(Ca + K) | P/Fe |
|---|---|---|---|---|---|---|---|---|
| 1A | 7.38 | 0.63 | 1.510 | 10.54 | | | 7.0 | 1.4 |
| 2A | 91.85 | | 8.360 | 57.91 | 3.09 | | 5.1 | 0.6 |
| 3A | 10.29 | | 1.100 | 7.74 | | 2.69 | 7.0 | 0.8 |
| 4A | 2.35 | | | | | 30.85 | | |
| 5A | 2.73 | | | | | 26.99 | | |
| 6A | 4.28 | | 0.950 | 5.59 | | 9.38 | 5.9 | 1.3 |
| 7A | 6.74 | | 1.350 | 10.31 | | | 7.6 | 1.5 |
| 8A | 9.77 | | 1.490 | 10.21 | | | 6.9 | 1.0 |

Eight EDS spectrums were collected along two tailing-cement boundaries. Two analyses were of the ore (Spectrums 4A and 5A) and six were within the cement and all contained phosphorus (Spectrums 1A-3A and 6A-8A). Spectrums 3A and 6A, which were nearest the tailing, also contained a silica phase.

Example 4

Magnetite ($Fe_3O_4$) concentrate, coarse tailings, orthophosphoric acid solution (in a concentration of 85 percent), water, and monocalcium phosphate (in the form of triple superphosphate fertilizer pellets) were provided.

To make 4 kg of activator, 400 g triple superphosphate (e.g., triple superphosphate fertilizer pellets) was mixed into 1,484 g water, and 2,116 g orthophosphoric acid (85 percent) was added.

The activator composition was 45 percent orthophosphoric acid ($H_3PO_4$), 45 percent water, and 10 percent monocalcium phosphate (triple superphosphate fertilizer pellets). The triple superphosphate fertilizer pellets were crushed in a mortar and combined with the quantity of water. At this point, a significant amount of the triple superphosphate fertilizer pellets remained undissolved in the solution. The orthophosphoric acid was slowly added into the monocalcium phosphate solution and stirred. The activator was allowed to sit for about two hours, which allowed time for the triple superphosphate to dissolve as much as possible. Residue in the pellets gave the solution an opaque brown tint and left a small accumulation of material that did not dissolve.

To make 20 kg of dry mix, 10 kg of magnetite concentrate and 10 kg of coarse tailings were used. The coarse tailings included a reactive iron concentration of about 3 percent by weight. The size of the coarse tailings was in a range of about −4 mesh to about +50 mesh. The magnetite concentrate particles used had a size of about −200 mesh and had a reactive iron concentration of about 67 percent by weight.

The mix was made one batch at a time in the cement mixer, with the activator added to the concentrate and coarse tailings mix. After mixing, rod mill feed ore was added to two separate batches in amounts of 20 kg and 10 kg, respectively, as a coarse aggregate. This took less than a minute. The total time of mixing was about four to ten minutes. The prepared mix was dumped into a wheelbarrow and taken directly to the potholes to be filled. A square-edged shovel was used to fill the potholes with material, and a come-along was used to distribute, smooth, and tamp the patch material.

This procedure worked well for filling two potholes. However, care was taken to use all of the prepared material within five minutes of activation. The short amount of time available for using the compound was balanced by the swiftness in which it cured. The patches had all hardened by the time cleaning the wheelbarrow and mixer was finished (approximately 20 minutes).

When using 20 kg of the rod mill ore, the large aggregate and lack of intermediate sizes led to a patch with a very rough surface. Shallow potholes did not fill completely with this amount of rod mill ore, since the pieces of ore did not appear to entirely bond to the cement matrix. The halved amount of 10 kg served to better fill shallow potholes and had a smoother surface after filling. Intermediate size aggregates may be useful to balance the size distribution and fill more space for less expense.

The complete disclosures of the patents, patent documents, and publications cited herein are incorporated by reference in their entirety as if each were individually incorporated. Various modifications and alterations to this invention will become apparent to those skilled in the art without departing from the scope of this invention. It should be understood that this invention is not intended to be unduly limited by the illustrative embodiments and examples set forth herein and that such examples and embodiments are presented by way of example only.

What is claimed is:

1. A system for use in preparing patching material, the system comprising one or more components, wherein the one or more components comprise:
    a plurality of magnetite concentrate particles having a size of −200 mesh, wherein the plurality of magnetite concentrate particles has a reactive iron concentration greater than 55 percent by weight;
    at least one acidic activator comprising phosphate anions; and
    a plurality of reactive aggregate particles comprising iron, wherein the reactive iron concentration of the plurality of reactive aggregate particles is in a range of 3 percent to 47 percent by weight, wherein the plurality of reactive aggregate particles has a size in a range of +100 mesh to −1 inch mesh, and further wherein the plurality of reactive aggregate particles is in a range of 15 percent to 80 percent by weight of all the one or more components of the system.

2. The system of claim 1, wherein the one or more components further comprise a plurality of filler particles having a size of −4 mesh.

3. The system of claim 2, wherein the plurality of filler particles comprise non-reactive filler particles.

4. The system of claim 1, wherein the plurality of reactive aggregate particles comprises reactive aggregate particles having a size in a range of +6 mesh to −½ inch mesh.

5. The system of claim 1, wherein the plurality of reactive aggregate particles is in a range of 15 percent to 45 percent by weight of all the one or more components of the system.

6. The system of claim 1, wherein the plurality of reactive aggregate particles comprises a plurality of filler particles comprising reactive iron and having a size of −4 mesh.

7. The system of claim 6, wherein the plurality of reactive aggregate particles comprises reactive aggregate particles having a size in a range of +6 mesh to −½ inch mesh.

8. The system of claim 1, wherein the reactive iron concentration of the plurality of reactive aggregate particles is in a range of 7 percent to 47 percent by weight.

9. The system of claim 1, wherein the at least one acidic activator comprises orthophosphoric acid.

10. The system of claim 1, wherein the at least one acidic activator comprises at least one phosphate salt.

11. The system of claim 1, wherein the one or more components are provided as a kit, wherein the at least one acidic activator is provided separately from the plurality of magnetite concentrate particles and the plurality of reactive aggregate particles.

12. The system of claim 11, wherein the kit further comprises at least one elastomeric coating composition provided separately from the at least one acidic activator, the plurality of magnetite concentrate particles, and the plurality of reactive aggregate particles.

13. The system of claim 1, wherein the one or more components further comprise a composition that comprises polyvinyl alcohol.

14. A method for applying patching material, the method comprising:
    preparing a mixture comprising:
        a plurality of magnetite concentrate particles having a size of −200 mesh, wherein the plurality of magnetite concentrate particles has a reactive iron concentration greater than 55 percent by weight;
        at least one acidic activator comprising phosphate anions; and
        a plurality of reactive aggregate particles comprising iron, wherein the reactive iron concentration of the plurality of reactive aggregate particles is in a range of 3 percent to 47 percent by weight, wherein the plurality of reactive aggregate particles has a size in a range of +100 mesh to −1 inch mesh, and further wherein the plurality of reactive aggregate particles is in a range of 15 percent to 80 percent by weight of the mixture;
    applying the mixture to a repair site; and
    allowing the mixture to cure.

15. The system of claim 14, wherein the plurality of reactive aggregate particles comprises reactive aggregate particles having a size in a range of +6 mesh to −½ inch mesh.

16. The system of claim 14, wherein the plurality of reactive aggregate particles comprises a plurality of filler particles comprising reactive iron and having a size of −4 mesh.

17. The system of claim 16, wherein the plurality of reactive aggregate particles comprises reactive aggregate particles having a size in a range of +6 mesh to −½ inch mesh.

18. A repair system for use in patching a repair site having at least one surface, the repair system comprising:

a mixture applied on at least one surface of a repair site resulting in an exposed mixture surface, the mixture applied on the at least one surface having a maximum first thickness measured from the at least one surface of the repair site to the exposed mixture surface, the mixture comprising:
  a plurality of magnetite concentrate particles having a size of −200 mesh, wherein the plurality of magnetite concentrate particles has a reactive iron concentration greater than 55 percent by weight;
  at least one acidic activator comprising phosphate anions; and
  a plurality of reactive aggregate particles comprising iron, wherein the reactive iron concentration of the plurality of reactive aggregate particles is in a range of 3 percent to 47 percent by weight, wherein the plurality of reactive aggregate particles has a size in a range of +100 mesh to −1 inch mesh, and further wherein the plurality of reactive aggregate particles is in a range of 15 percent to 80 percent by weight of the mixture; and
  at least one elastomeric coating applied on the exposed mixture surface, wherein the elastomeric coating has a second thickness, and further wherein the first thickness is greater than or equal to 90 percent of a total thickness of the maximum first thickness and second thickness.

19. The repair system of claim 18, wherein the elastomeric coating comprises at least one of a urethane-based material and an epoxy-based material.

20. The repair system of claim 18, wherein the elastomeric coating comprises a plurality of coating filler particles.

* * * * *

UNITED STATES PATENT AND TRADEMARK OFFICE
CERTIFICATE OF CORRECTION

PATENT NO.         : 7,939,154 B2
APPLICATION NO.    : 12/262861
DATED              : May 10, 2011
INVENTOR(S)        : Fosnacht et al.

It is certified that error appears in the above-identified patent and that said Letters Patent is hereby corrected as shown below:

Column 1, line 12, add the following paragraph:

STATEMENT OF GOVERNMENT RIGHTS
This invention was made with government support under Grant #06-79-05068 from the U.S. Economic Development Administration. The U.S. Government has certain rights in this invention.

Column 34, Claim 15.
Delete "system" and insert --method--

Column 34, Claim 16.
Delete "system" and insert --method--

Column 34, Claim 17.
Delete "system" and insert --method--

Signed and Sealed this
Twenty-eighth Day of June, 2011

David J. Kappos
*Director of the United States Patent and Trademark Office*